United States Patent
Rohit et al.

(10) Patent No.: US 9,155,076 B2
(45) Date of Patent: *Oct. 6, 2015

(54) METHOD AND SYSTEM FOR BEARER MANAGEMENT

(71) Applicant: Tejas Networks Limited, Bangalore (IN)

(72) Inventors: Kumar Rohit, Bangalore (IN); R C Sanil, Bangalore (IN); Kumar M Vinod, Bangalore (IN)

(73) Assignee: Tejas Networks Ltd. (IN)

( * ) Notice: Subject to any disclaimer, the term of this patent is extended or adjusted under 35 U.S.C. 154(b) by 105 days.

This patent is subject to a terminal disclaimer.

(21) Appl. No.: 13/752,891

(22) Filed: Jan. 29, 2013

(65) Prior Publication Data

US 2013/0201901 A1 Aug. 8, 2013

(30) Foreign Application Priority Data

Feb. 2, 2012 (IN) .............................. 397/CHE/2012

(51) Int. Cl.
*H04W 72/04* (2009.01)
*H04W 76/02* (2009.01)
*H04W 84/04* (2009.01)

(52) U.S. Cl.
CPC ........ *H04W 72/0406* (2013.01); *H04W 76/022* (2013.01); *H04W 84/047* (2013.01)

(58) Field of Classification Search
CPC ............ H04W 72/04; H04W 72/0406; H04W 72/0426; H04W 76/022; H04W 84/047
See application file for complete search history.

(56) References Cited

U.S. PATENT DOCUMENTS

| 8,442,049 | B2* | 5/2013 | Liu et al. ................... | 370/392 |
| 8,724,648 | B2* | 5/2014 | Zeng et al. ................ | 370/436 |
| 2011/0149886 | A1* | 6/2011 | Xu et al. ..................... | 370/329 |
| 2011/0267943 | A1* | 11/2011 | Huang et al. ............... | 370/230 |
| 2011/0280127 | A1* | 11/2011 | Raaf et al. ................. | 370/230 |
| 2013/0201901 | A1* | 8/2013 | Rohit et al. ................ | 370/315 |
| 2013/0201934 | A1* | 8/2013 | Rohit et al. ................ | 370/329 |

OTHER PUBLICATIONS

3GPP Organizational Partners, 3GPP TR 36.806 V9.0.0, "Technical Specification Group Radio Access Network; Evolved Universal Terrestrial Radio Access (E-UTRA); Relay architectures for E-UTRA (LTE-Advanced)". Mar. 2010, pp. 1-34, Release 9, 3GPP Organizational Partners, Valbonne, France.

* cited by examiner

*Primary Examiner* — Ajay Cattungal
(74) *Attorney, Agent, or Firm* — Merchant & Gould P.C.

(57) ABSTRACT

A method and system of bearer management signalling in a communication network comprising of transporting bearer resource request message of both the UE and RN via DeNB to managing entity of UE within EPC, as a signalling message over uplink channel referred to as 'Union of Resource Request (UR Request)' message. The bearer resource response message from one of the managing entity of UE or managing entities of UE and RN within EPC are transported as a signalling message to Evolved Packet Edge (EPE) via DeNB over the downlink channel referred to as 'Intersection of Admission Response (IA Response)'. This manages bearer setup signalling as a single loop, by transportation of 'UR Request' signalling message and receiving one 'IA Response' signalling message over uplink and downlink channels respectively. EPE is a conglomeration of network nodes comprising of UEs, RNs and all other network nodes that communicate over EPC via DeNB.

12 Claims, 20 Drawing Sheets

METHOD AND SYSTEM FOR BEARER MANAGEMENT

FIELD OF THE INVENTION

The present disclosure relates to bearer management in a wireless communication network. In particular, the invention relates to transport of signalling messages on the interface between a relay node and another node in a mobile communication network.

BACKGROUND

In order to provide better qualities of service and wider communication ranges between wireless nodes, the concept of relay station has been introduced in network systems. The purpose of deploying relay station or Relay Node (RN) in network system is to extend the serving coverage of base station; hence, user equipment (UE) which is not within the communication coverage of base station can access the services provided by relay node as well via base station.

Wireless network architecture as defined by 3GPP introduces wireless relay node (RN) entity to extend the coverage of base station (eNB). A long term evolution-advanced (LTE-A) system, as its name implies, is an evolution of the LTE system, considering relaying for cost-effective throughput enhancement and coverage extension. For example, a relay can be deployed at the cell edge where the eNB is unable to provide required radio quality/throughput for the UEs or at certain location where radio signals of the eNB cannot cover.

The Relay Node (RN) forms an independent physical cell. From a user equipment (UE) perspective, the RN is seen as a usual base station. The RN is connected via a wireless link to the base station. The relay node architecture deployment foresees that a RN emulates a base station for the UE, which means that the UE would see the RN as a usual base station. From the network side, the RN is seen as a usual UE by the base station. The base station, to which the RN is connected, is called Donor-eNB (DeNB) and operates as a usual base station. The deployment of RN in the 3GPP network architecture is described in 3GPP Technical Specification 36.806; "Relay architectures for E-UTRA (LTE-Advanced)".

In order for the user equipment to receive a service from the network, it needs to establish connectivity via base station, by initiating Non-Access Stratum (NAS) signalling messages with network nodes like Mobility Management Entity (MME) serving the UE. Consequential signalling messages are exchanged between network nodes to allocate bearer resources for UE and RN to service the UE request. The above bearer management procedure can be initiated by UE or the Evolved Packet Core (EPC in terms of 3GPP LTE) or simply the communication network. Similar procedures are followed for managing existing bearers. The managing functions include creating new entry, updating and deleting.

Thus, whenever a UE bearer is created or modified, the RN bearer modify or create procedures may be initiated by the RN. This increases the exchange of messages separately for the UE and for the RN to modify/create a new bearer. Thus additional messages may be exchanged by the RN each time a bearer is created/modified for the UE, leading to delayed access service and as well as backhaul bandwidth is wasted or underutilized. Therefore, there is a need for a bearer management to optimize radio and backhaul resources by effectively setting-up the bearers.

SUMMARY OF THE INVENTION

The summary represents the simplified condensed version of the claimed subject matter and it is not an extensive disclosure of the claimed subject matter. The summary neither identifies key or critical elements nor delineates the scope of the claimed subject matter. The summary presents the simplified form of the claimed subject matter and acts as a prelude to the detailed description that is given below.

The present invention and its embodiments are made to provide for a feasible solution for facilitating bearer management in a communication network optimizing exchange of signalling communication in managing bearers for UE and RN.

An aspect of the invention provides for a method of managing bearer signalling in a communication network, by transporting "Union of Resource Request" (UR Request) signalling message from Evolved Packet Edge (EPE) entities to managing entities of UE via DeNB and receiving "Intersection of Admission Response" (IA Response) signalling message for the transported UR Request from at least one of the said managing entity of UE by DeNB, wherein the said management entity serves/manages all the entities in the EPE. EPE is a conglomeration of network nodes comprising of user equipment, relay nodes and all other network nodes that communicate over EPC via DeNB. Network nodes in the EPE may establish connectivity external to EPC like Internet or PSTN (Public Switch Telephone Network).

Another aspect relates to receiving "Intersection of Admission Response" (IA Response) signalling message for the transported UR Request from managing entities of UE by the DeNB, wherein at least one of the said managing entities are not serving/managing the same entities in the EPE. Another aspect relates to transmitting bearer request, either single or multiple bearers within a single NAS message from the user equipment (UE) coupled to a relay node (RN), or relay nodes, to a mobility management entity serving the user equipment (MME_UE) via DeNB. The bearer request is received at the relay node (RN) as a UE NAS Message which is added with the relay node identity RN_ID, (referred to as tagging and represented as RN_TAG) and forwarded to MME_UE via DeNB by insertion of RN_TAG message at any one of the protocol layers preferably over any one of the NAS, S1-AP, SCTP protocol layers. The RN_TAG message is processed by the mobility management entity serving the user equipment (MME_UE). MME_UE grants utmost UE request and then a 'RR Request' message for relay nodes is generated by the Mobility Management Entity serving the user equipment (MME_UE) based on the RN_IDs stored, to be sent to the mobility management entity serving the relay node (MME_RN). Upon receiving the 'RR Request' message, MME_RN processes the bearer request of RN and if MME_RN grants utmost RN bearer request, a 'RR Response Positive Ack' message, is generated and forwarded to MME_UE. In response MME_UE generates "IA Response Accept" message and forwards to DeNB.

Another aspect relates to generating "IA Response Reject" message and forwarding to DeNB, if the MME_RN does not grant RN bearer request. Another aspect relates to generating 'UE NAS message for bearer resource reject' if the MME_UE upon receiving the RN_TAG message from RN does not grant UE bearer request. All the above responses are available to DeNB. The DeNB receives at least one among the above responses from MME_UE.

Another aspect relates to systems facilitating the above method of managing bearers each comprising of at least a receiver, for receiving the said messages, processors for executing the functions, transmitter for transmitting messages, a memory for storing information and retaining instructions for executing functions associated with the above methods.

Another aspect relates to respective network nodes like RN, DeNB, MME_UE and MME_RN facilitating the above method of managing bearers each comprising of at least a receiver, for receiving the said messages, processors for executing the functions, transmitter for transmitting messages, a memory for storing information and retaining instructions for executing functions associated with the above methods.

Other aspects, advantages, and salient features of the invention will become apparent to those skilled in the art from the following detailed description, which, taken in conjunction with the annexed drawings, discloses exemplary embodiments of the invention.

DESCRIPTION OF THE DRAWINGS

The features, advantages and other aspects of the embodiments of the present invention will be obvious to any person skilled in the art to appreciate the invention when read with the following description taken in conjunction with the accompanying drawings.

The figures are not drawn to scale and are illustrated for simplicity and clarity to help understand the various embodiments of the present invention. Throughout the drawings it should be noted that like reference numbers are used to depict the same or similar elements, features and structures.

DETAILED DESCRIPTION

Figure 1:
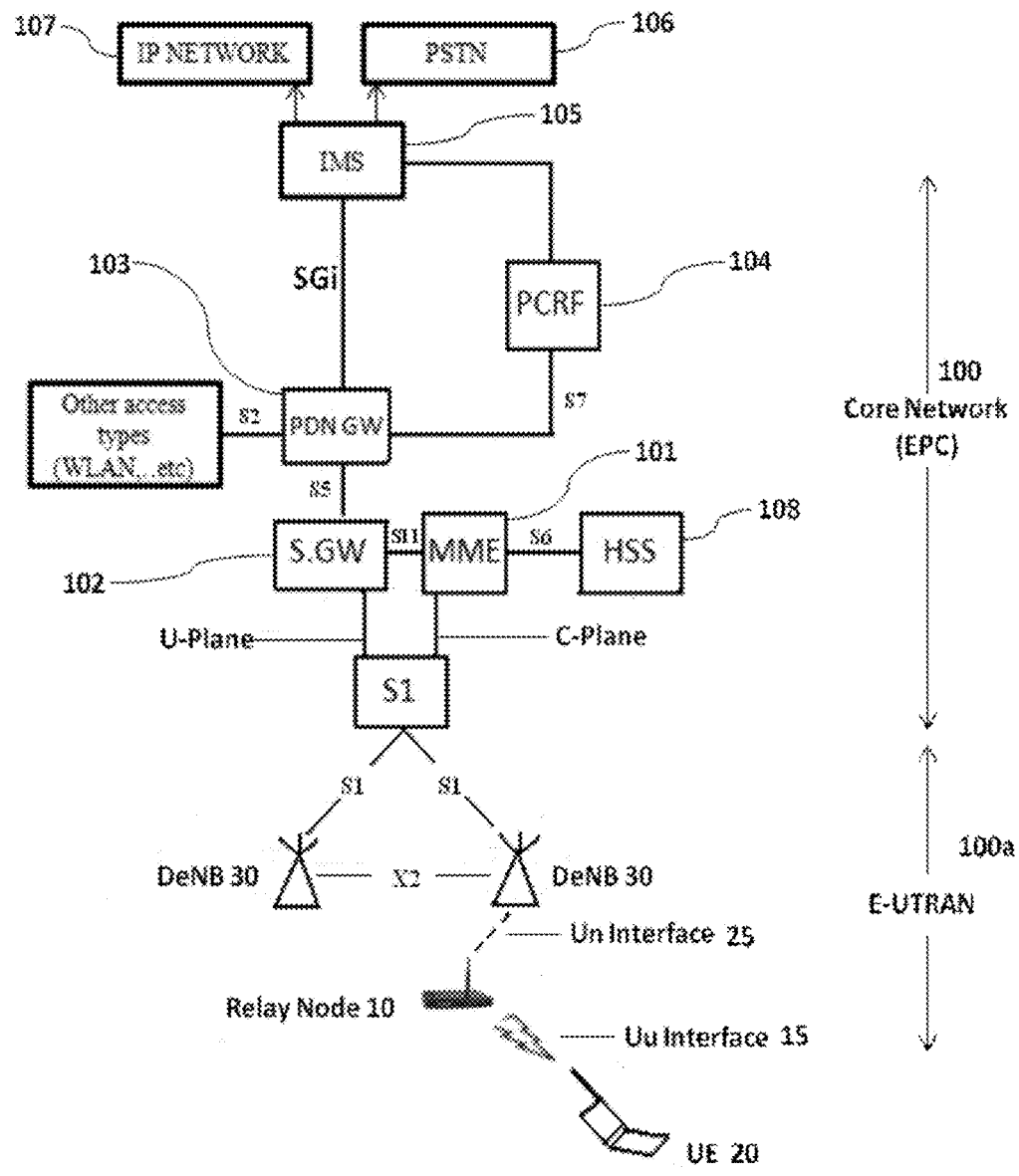
FIG. 1 illustrates a relay enhanced communication network as specified in 3GPP LTE network architecture, where the subject matter of the embodiments of the invention is deployed.

The following descriptions with reference to the accompanying drawings are provided to assist in a comprehensive understanding of exemplary embodiments of the invention as defined by the claims and their equivalents. Accordingly, those of ordinary skill in the art will recognize that various changes and modifications of the embodiments described herein can be made without departing from the scope and spirit of the invention.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention are provided for illustration purpose only and not for the purpose of limiting the invention as defined by the appended claims and their equivalents.

In the figures certain embodiments are shown in block diagrams in order to facilitate describing those embodiments. The terms, component, module, system, and the like are intended to refer to an entity or entities within a communication network node comprising of; hardware, software, a combination of hardware and software. For eg., a component may be, but not limited to being, a process running on a processor, a processor, an integrated circuit, or a computer. Both an application running on a computing device and the computing device can be a component. A component may be localized on one computer and/or distributed between two or more computers. The components may communicate by way of local and/or remote processes.

Those skilled in the art will understand that the principles of the present disclosure may be implemented in any suitably arranged systems. The terms used to describe various embodiments are exemplary. It should be understood that these are provided to merely aid the understanding of the description, and that their use and definitions in no way limit the scope of the invention.

Any term specifically reciting some of the present invention's characteristic, parameter, or value need not be achieved exactly, but that deviations or variations, including tolerances, measurement error, measurement accuracy limitations and other factors known to those of skilled in the art, may occur in amounts that do not preclude the effect the present invention was intended to provide.

The present invention and its embodiments are mainly described in relation to 3GPP specifications and standards (LTE-Advanced) for applicability of certain exemplary embodiments. The terminology used is therefore related thereto. Such terminology is used in the context of describing the embodiments of the invention and it does not limit the invention in any way. Any other network architecture or system deployment, etc., may also be utilized as long as it is compliant with the features described herein.

In particular, embodiments of the present invention may be applicable in any relay-enhanced (cellular) system with a need for signalling optimization. Embodiments of the present invention may be applicable for/in any kind of modern and future communication network including any mobile/wireless communication networks/systems.

Example embodiments to be described below are not intended to limit the present invention to any specific example, embodiment, environment, applications, or particular implementations described in these example embodiments. It should be appreciated that, in the following example embodiments and the attached drawings are illustrated for the ease of understanding, but not to limit the actual scale.

The following paragraphs will describe various embodiments of the invention. For exemplary purposes only, most of the embodiments are outlined according to the LTE-Advanced mobile communication system with the solution to the problem discussed in the background. It should be noted that the invention may be advantageously used in connection with the communication system described above, but the invention is not limited to its use in this particular exemplary communication network. The explanations given below are intended to better understand specific exemplary embodiments described herein and should not be understood as limiting the invention to the specific implementations of processes and functions in a mobile communication network. The improvements/solutions proposed herein may be readily applied in architectures/systems having relevance to relay architectures. Some embodiments of the invention may also make use of standard and improved procedures of these architectures/systems.

The techniques described herein may be used for various wireless communication networks such as CDMA networks, CDMA implementing radio technology such as UTRA, TDMA networks, TDMA implementing radio technology such as GSM, FDMA networks, OFDMA networks, OFDDA implementing radio technology such as Evolved URTA (E-UTRA), SC-FDMA networks.

User equipment (UE) used in the following description denotes various terminologies used like an access terminal (AT), wireless communication device, terminal, wireless handset, computer or wireless module, wireless module for use with a computer, personal digital assistant (PDA), tablet computer or device.

FIG. 1 represents an overall architecture of a network with a relay node (RN). A relay node 10 has a donor base station (DeNB) 30 and a terminal side called as user equipment (UE) 20. Towards UE 20 the RN 10 behaves as a conventional eNB using the access link 15 (Uu interface) and the UE 20 is not aware of whether it is communicating with a relay node 10 or a base station 30. Relay nodes are therefore transparent for the UE. Towards base stations relay nodes initially operate as a UE using the radio interface to connect to the base station. Once connection is established and the relay node is configured, the relay uses a subset of the UE functionality for communication on the backhaul link 25 (Un interface). In relay architecture as shown in the above figure, donor eNB 30 acts as a proxy between the core network 100 and the relay node 10. From the relay perspective, it appears as if RN 10 is directly connected to the core network 100 as the donor eNB appears as a mobility management entity (MME) 101 for the S1 interface and a base station (eNB) for X2 interface towards the relay node 10. From the perspective of core network 100, the relay node 10 appears as it belongs to the donor eNB.

Core network 100 and also other blocks (106, 107), show the relationship between them. The above diagram shows signalling interfaces. Interfaces like S1; S2 supports both user plane and control plane signalling, whereas interfaces like S6, S7 support only control plane signalling. The IMS (IP Multimedia Subsystem) 105 located on top of the blocks provide access to both private IP network 107 and PSTN (Public Switched Telephone Network) 106 via Media Gateway network entities. The HSS (Home Subscriber Server) 108 manages user subscription information and provides services to all Core Network (CN) 100 blocks of 3G and evolved 3G architecture. The MME 101 is in charge of all the control plane functions related to subscriber and session management. Its responsibility includes connection/release of bearers to a terminal, handling of IDLE to ACTIVE transitions, and handling of security keys. The functionality operating between the UE and the Core Network is referred to as Non-Access Stratum (NAS), whereas Access Stratum (AS) handles functionality operating between the terminal and the radio access network. It supports security procedures, terminal-to-network session handling, and Idle terminal location management. The MME 101 is linked through the S6 interface to the HSS and is linked through the S1 interface to the donor eNB. The Serving GW is the termination point of the packet data interface towards donor eNB and UE through RN (E-UTRAN 100a). When UEs move across eNB in E-UTRAN 100a, Serving GW 102 serves as a local mobility anchor, meaning that packets are routed through this point for intra E-UTRAN mobility and mobility with other 3GPP technologies like 2G/GSM and 3G/UMTS. The Packet Data Network Gateway (PDN GW) 103 is similar to the Serving GW 102. The PDN GW is the termination point of the packet data interface towards Packet Data Network and also supports policy enforcement features as well as packet filtering (like deep packet inspection for virus signature detection) and evolved charging support (like per URL charging). Policy and Charging Rules Function (PCRF) 104 enforces policy features (which apply operator-defined rules for resource allocation and usage.

The UEs are connected to the RN by means of an Uu interface 15 and the RN to the Donor eNB by means of Un interface 25. Multiple base stations (eNBs) are normally interconnected with each other by means of the X2-Interface, and to the Core Network by means of the S1 interface, more specifically to the MME (Mobility Management Entity) via the S1-MME, and to the Serving Gateway (S-GW) by means of the 51-U interface. The S1 interface supports a many-to-many relation between MMEs/Serving Gateways and multiple base stations.

When the network eg., MME 101 has no valid location or routing information for the UE 20, the UE 20 cannot be reached. This is more likely when the UE 20 is in a state of switched off, or out of coverage area. 3GPP defines this state as a de-registered state and this could also happen when the UE is in non-3GPP access. When the UE 20 is attached to the network eg., MME 101, it can receive Core Network 100 services. This state is defined by 3GPP as registered state. In this registered state the UE 20 can be in two different connection management states like RRC_IDLE state and RRC_CONNECTED state. When no data is being transmitted and the radio resources are released, the UE has a valid IP configuration. In such idle state there is no Non-Access Stratum (NAS) signalling connection between the UE and the network, e.g., MME 101. Also during the idle state there is no S1 connection between the eNB and the Serving Gateway. In the RRC_CONNECTED state, there is an active connection between the UE 20 and donor eNB 30, which implies a communication context being stored within the donor eNB 30 for this UE 20. Both sides can exchange user data and or signalling messages over logical channels.

From the wireless network perspective, protocol structure for the User and Control planes correspond to user data transmission and signalling transmission. Control plane corresponds to the information flows actually considered as signalling by E-UTRAN 100a and Core Network 100. This includes all the RRC (Radio Resource Control) E-UTRAN signalling (supporting functions such as Radio Bearer management, radio mobility, user paging) and NAS (Non Access Stratum) signalling. On the radio interface, the Control plane uses the Control plane protocol stack namely PDCP (Packet Data Convergence Protocol), RLC (Radio Link Control), MAC (Medium Access Control) and PHY (Physical) stack to transport both RRC and Core Network NAS signalling. The above protocol stack layers support the same functions for both the User and Control Planes. The NAS signalling stops at MME 101 level because the top-level protocols terminate in the MME.

When a Non-Access Stratum (NAS) signalling connection needs to be established between the UE 20 and the MME 101 routed via relay node 10, the UE 20 and the MME 101 shall enter the connected state. The NAS protocol/signalling occurs between the UE 20 and the MME 101 via relay node 10, thus supporting mobility management functionality as well as the user plane bearer activation, modification and deactivation.

Figure 2:
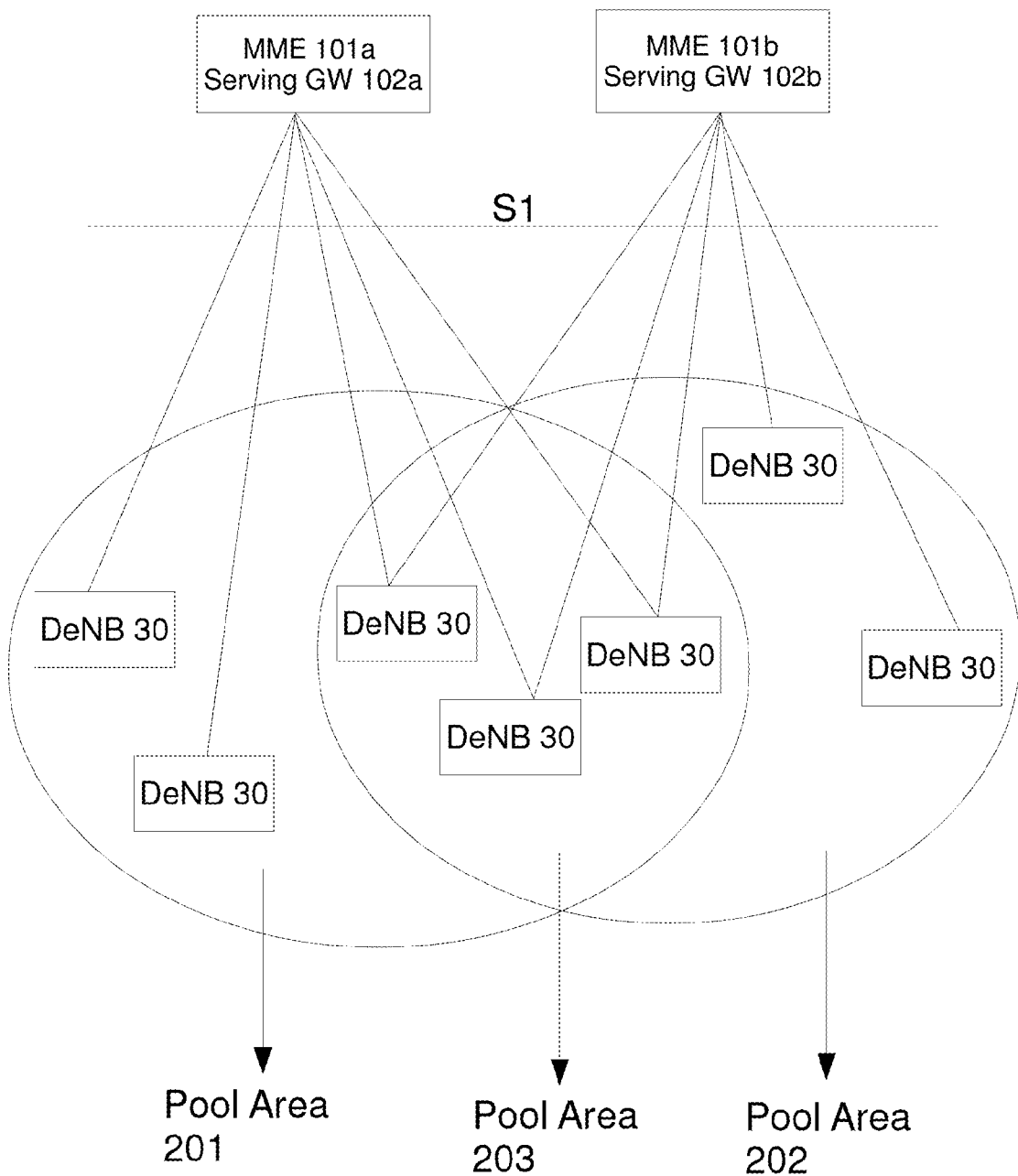
FIG. 2 is an illustrative representation of multiple base stations (DeNB), as specified in 3GPP network architecture, being served by one or more of MMEs and SGWs.

It should be noted that donor eNB is in fact connected to one or more than one MME or Serving GW node. In the FIG. 2, MMEs 101 and Serving GWs 102 are seen connected to more than one donor eNB 30. These plurality of donor eNB form a pool area 203 such that a pool area can be served by one or several MME and/or Serving GW. A given MME or Serving GW node may serve one or several pool areas. The connectivity of the relay node and the UE communicating via relay node, is managed by the network eg., MME. The MME manages a pool referred to as 201, 202 or 203 as shown in FIG. 2. Based on initial NAS signalling, MMEs in the pool analyzes the request and determines which MME should manage the radio resources for the respective relay node or the UE communicating via relay node. This communication message essentially comprising of bearer request acknowledgement, indicates the uplink channel through which the UE is to communicate for establishing radio bearers. For the sake of simplicity MME 101a managing the UE 20 and the MME 101b managing the RN 10 is indicated as MME_UE and MME_RN respectively, hereinafter. Similarly the Serving GW 102 managing the UE 20 and the Serving GW 102 managing the RN 10 is indicated as SGW/PGW_UE and SGW/PGW_RN respectively, hereinafter.

Figure 3:
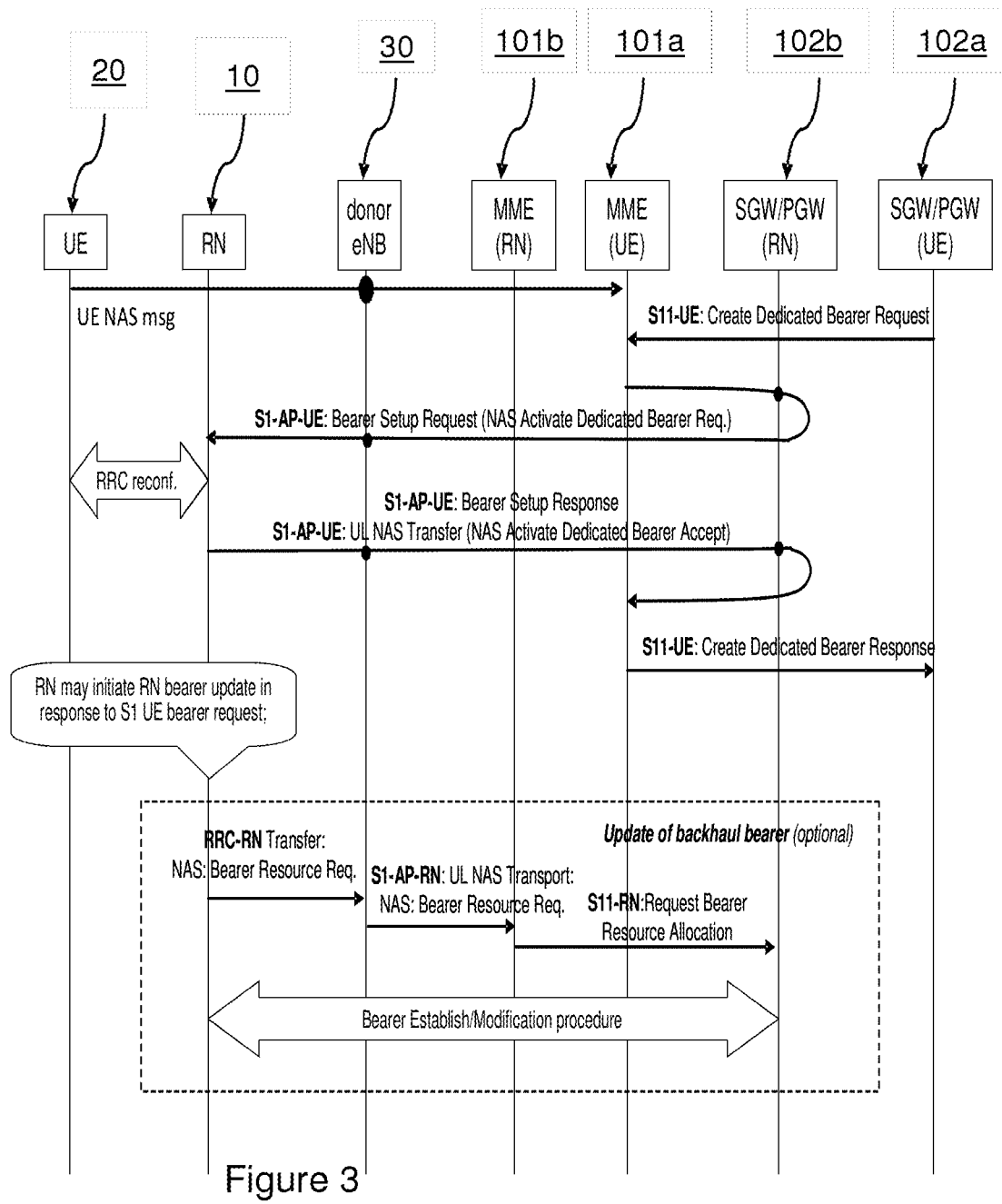
FIG. 3 is an illustration of existing bearer establishment procedure for user equipments (UE) and relay nodes (RN) as specified in 3GPP LTE (A) network architectures.

FIG. 3 shows the signalling message for bearer initiation procedure existing in 3GPP LTE specification. UE 20 sends an initial NAS message or service request to the MME_UE 101a, which is routed through RN 10 and Donor eNB 30. When a NAS layer in the UE has to send an initial NAS message denoted as 'UE NAS Msg' in FIG. 3, the UE first initiates the establishment of the Radio Resource Control (RRC) connection over the Uu interface. The RRC procedures are elaborated in 3GPP specification TS 36.331 available at www.3gpp.org. In parallel to the establishment of the RRC connection over the Uu interface, the RN initiates the establishment of the RRC connection over the Un interface. The RRC connection establishment procedure over the Uu and Un interfaces are identical.

The Non-initial NAS message is a ciphered message directed to MME (UE) 101a and the RN 10 is transparent. The MME_UE 101a understands the message and forwards it to the SGW/PGW_UE 102a for checking the UE subscription data (which is to be obtained from HSS 108, FIG. 1). Then the SGW/PGW_UE 102a authorizes MME_UE 101a to create a dedicated bearer and sends the message over S11 interface (Interface between S/PGW and MME). On receiving the response, MME_UE 101a sends bearer setup request to the UE 20 as an S1-AP message routed through RN 10. RN 10 understands this S1-AP message and initiates RRC configuration between UE 20 and RN 10. A bearer setup response is then sent by UE 20 to MME_UE 101a routed via RN 10 and Donor eNB 30 as an S1-AP message. On receiving the response from UE 20, MME_UE 101a establishes the bearers and sends the response to SGW/PGW_UE 102a. This process establishes radio bearers to enable data flow from the SGW/PGW_UE 102a to the UE 20. After completion of this procedure, the RN 10 may send a NAS message seeking bearer-resource request to MME_RN 101b through Donor eNB 30. MME_RN 101b understands the message and provisions bearer resource allocation to RN 10. Upon receiving bearer resource allocation, RN 10 bearer establishment is completed. Radio resources for the relay node 10 are allocated so as to serve the already established UE's bearer requirements. The above process of initiating bearer establishment can also be initiated by EPC/Core Network. This happens both when the UE 20 is in the RRC_IDLE state and a message/data is to be transported to the UE 20 by the Core Network or when there is a change in existing bearer configuration to the UE 20 in the RRC_CONNECTED state. In this state, MME_UE 101a initiates bearer-setup or modify procedure for the UE 20 at any point of time based on UE subscription and QoS requirements. Thus in all the above instances of UE NAS Messages, whenever a UE 20 bearer is created or modified, the RN bearer, modify or create may be initiated subsequently by the RN 10. Thus additional messages are exchanged separately for the UE 20 and for the RN 10 to modify/create a new bearer. This either wastes or underutilizes the backhaul bandwidth. Further, there is delay in traffic flow.

Figure 4:
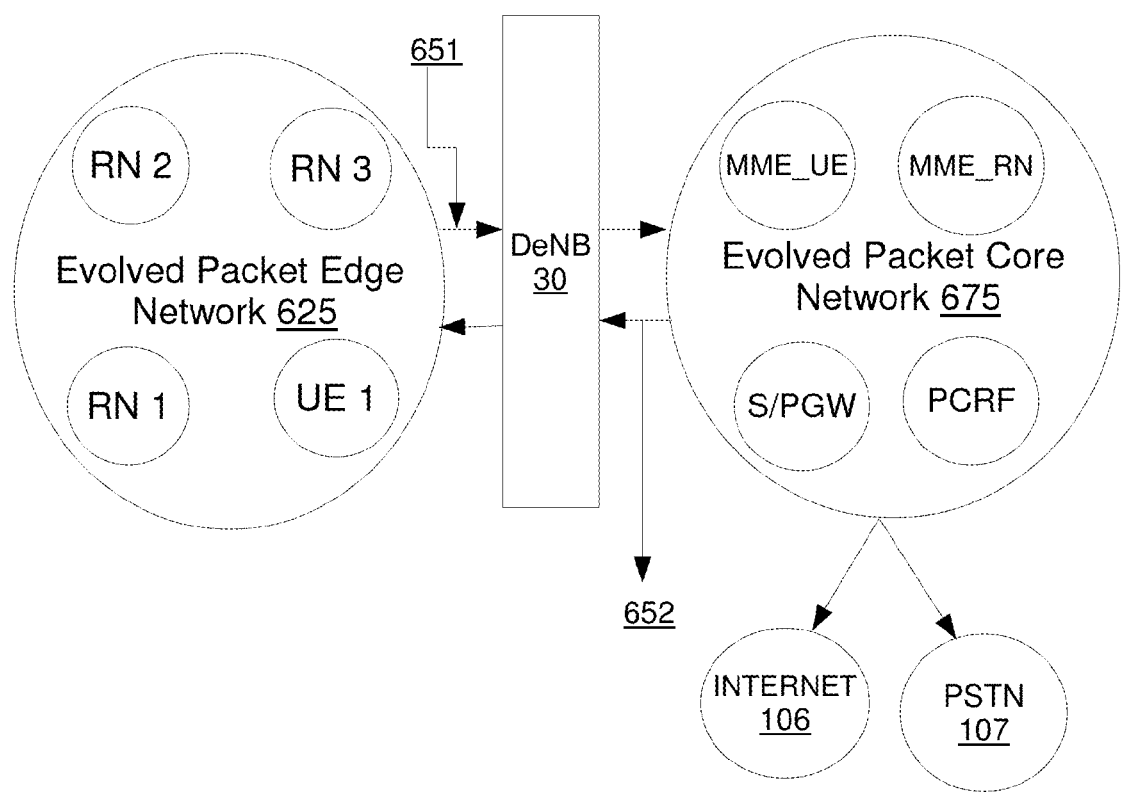
FIG. 4 shows the network nodes conglomeration between two network entities in accordance with the principles of the invention.

FIG. 4 shows the network nodes conglomeration between two network entities in accordance with the principles of the invention. Network entity 625 is called as Evolved Packet Edge (EPE) comprising of plurality of network nodes like UE, RN and all other nodes that communicate with Evolved Packet Core Network entity 675 via DeNB 30. Network nodes in the EPE 625 may establish connectivity external to EPC like Internet 106 or PSTN (Public Switch Telephone Network) 107. EPC entity 675 comprises of network nodes like Mobility Management Entity (MME), Serving gate way/Packet gate way (S/PGW), Policy of Charging Rules Function[PCRF-actually a concatenation of PDF (Policy Decision Function) and CRF (Charging Rules Function) network nodes] etc., These nodes essentially manages the entities in the EPE. For e.g., a UE bearer resource request is processed and allowed only by the MME serving the UE. Depending on the complexity of the communication network, it so happens that, MMEs are segregated to perform management of plurality of UE and RN separately. In such cases, it is appropriate to indicate MMEs serving the UEs as MME_UE and MMEs serving the RNs as MME_RN.

As part of bearer management signalling as envisaged, a communication from EPE 625 comprising of bearer resource request of both the UE and RN is transported via DeNB 30 to EPC as a single signalling message over uplink channel hereinafter referred to as "Union of Resource Request" (UR Request) message. The response message comprising of bearer resource response from either one of the managing entity or managing entities of EPC 675 are transported as a single signalling message to DeNB 30 over the downlink channel 652 hereinafter referred to as "Intersection of Admission Response" (IA Response). This manages bearer setup signalling loop, with a single transportation of 'UR Request' signalling message and receiving one "IA Response" signalling message over uplink and downlink channels respectively.

Figure 5:
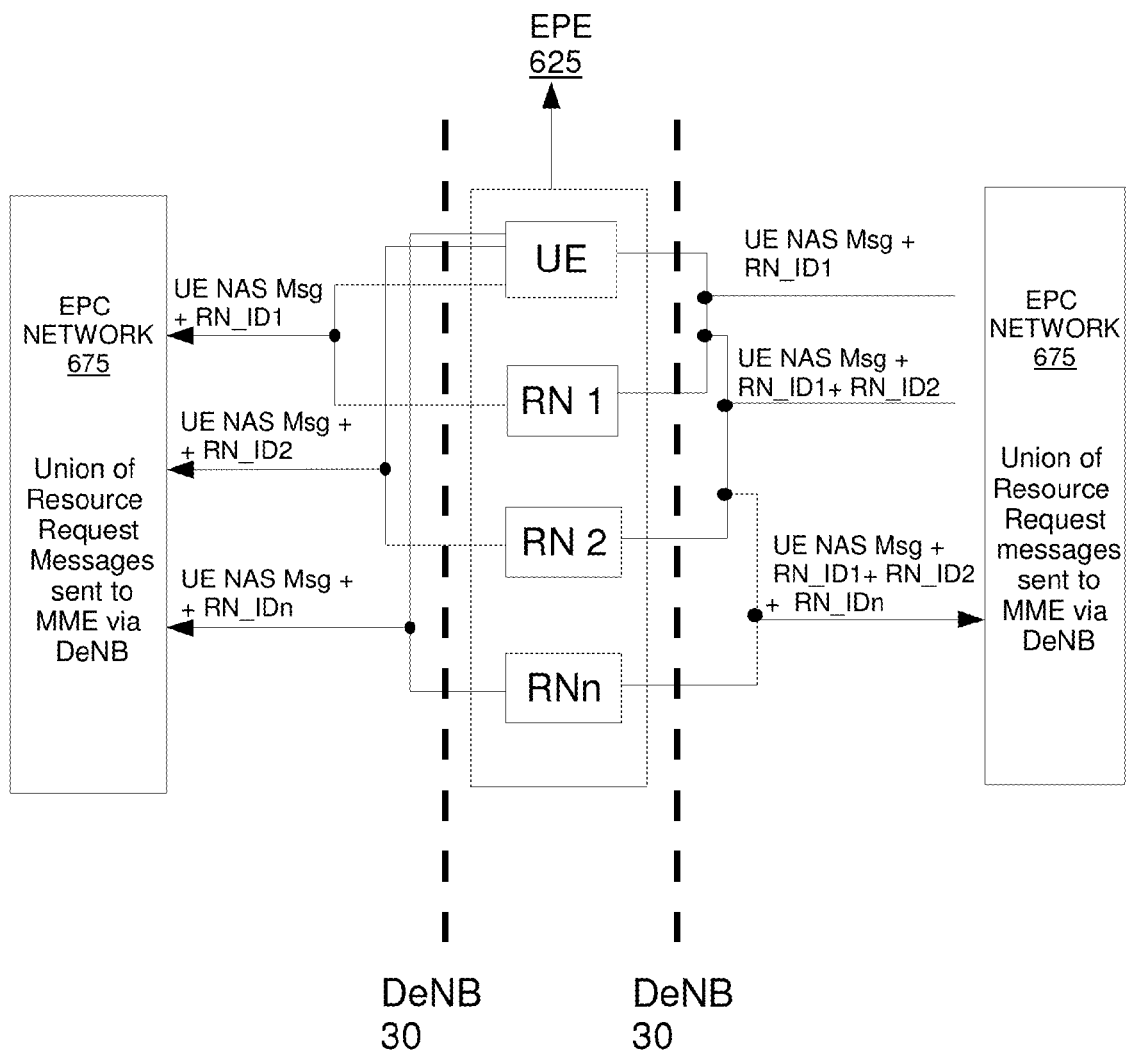
FIG. 5 represents 'UR Request' message signalling in the uplink from Evolved Packet Edge to Evolved Packet Core via DeNB in accordance with the embodiments of the invention.

FIG. 5 represents "UR Request" message signalling in the uplink from EPE to EPC 675 via DeNB 30 in accordance with the embodiments of the invention. When the UE 20 is in the state of RRC_CONNECTED or RRC_IDLE; a UE NAS signalling message requesting bearer resource of the form 'Create, Update, Detach, Modify' etc., hereinafter referred to as "CRUD" messages, are generated. It so happens that, depending on the complexity of the EPE communication network, multiple relay nodes may be wirelessly connected in a sequence so as to serve a distant UE. In such cases, a bearer request of a UE initiated by sending a UE NAS message to the MME in the EPC 675, has to be routed via all the relay nodes acting in sequence. Such an arrangement is shown towards the right of EPE 625.

As soon as the UE NAS message generated by UE 20 is received at RN 1, RN1 adds its identity with the UE NAS message, denoted as 'UE NAS Msg+RN_ID1' referred to as 'first tagged message' and routes the first tagged message to RN 2. Relay node identity or RN_ID is a unique identifier that uniquely identifies the MME serving the said RN. Relay node identity comprises of MME Group ID, MME code of MME_RN. RN 2 adds its identity with the received first tagged message denoted as 'UE NAS Msg+RN_ID1+RN_ID2' and referred to as 'second tagged message' and routes the second tagged message to such 'n' number of RNs, such that it finally ends up with RNn. RNn adds its identity with the received such 'multiple tagged messages' denoted as 'UE NAS Msg+RN_ID1+RN_ID2+RN_IDn' hereinafter referred to as 'tagged message' and forwards the said tagged message to the managing entity of EPC 675 via DeNB 30. This tagged message is available at the EPC as 'UR Request' message.

Depending on the mobility of the UE within EPE of a communication network, it so happens that, a single UE may be connected to different relay nodes at random. Such circumstances may arise based on the mobility of the UE and/or proximity of the UE with a RN exhibiting excellent signal strength. In such cases, a bearer request of a UE initiated by sending a UE NAS message to the MME in the EPC 675 has to be routed through the respective RN which is coupled to the UE. Such an arrangement is shown towards the left of EPE 625.

As soon as the UE NAS message generated by UE 20 is received at RN1, RN1 adds its identity with the UE NAS message, denoted as 'UE NAS Msg+RN_ID1' which becomes a tagged message. This tagged message represented as 'RN_TAG' is forwarded by the RN1 to the managing entity of EPC 675 via DeNB 30. This RN_TAG message is also available at the EPC as "UR Request" message.

Figure 6:
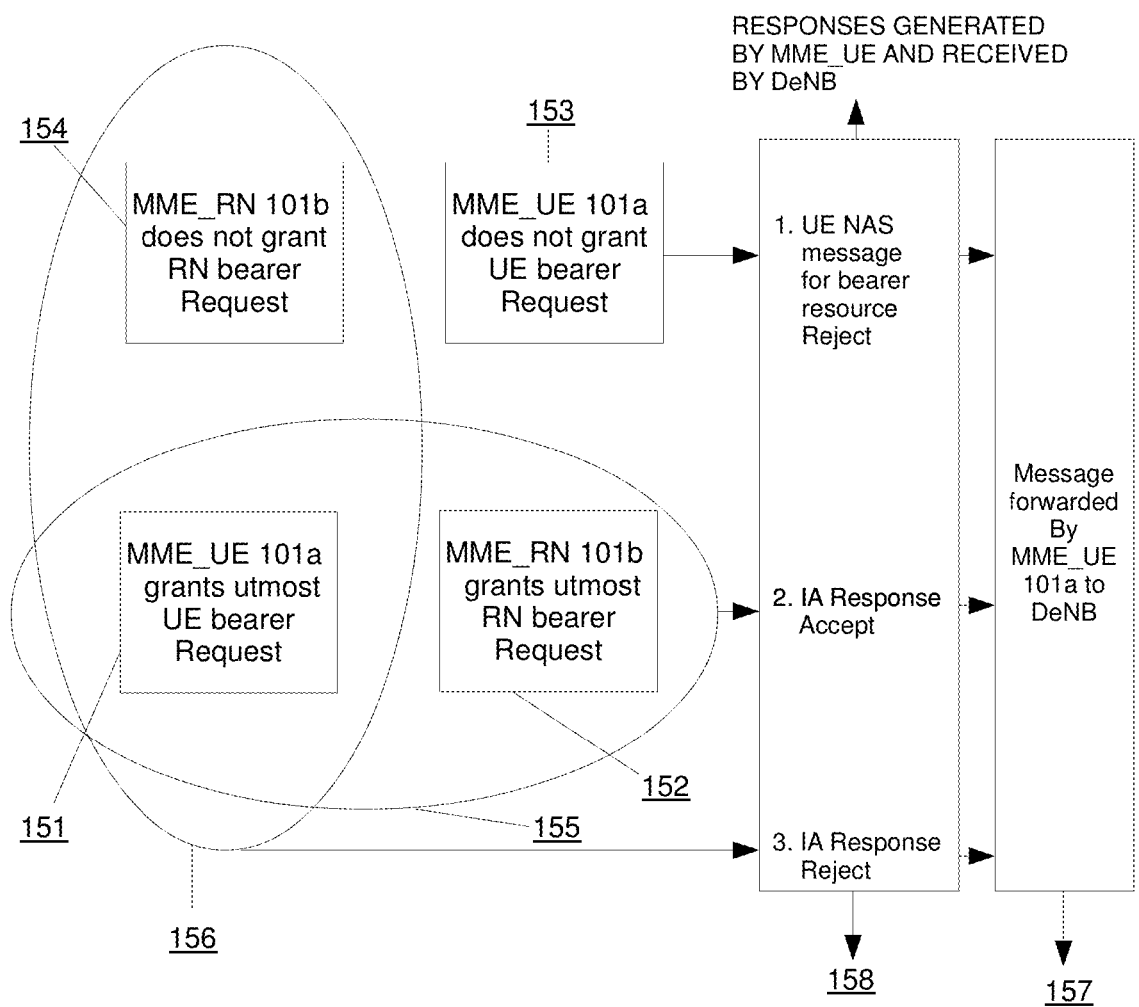
FIG. 6 depicts the 'Intersection of Admission Responses' (IAR) that are available to DeNB in accordance with the embodiments of the invention.

FIG. 6 depicts the "Intersection of Admission Response" (IA Response) that is available to donor eNB 30. "Intersection of Admission Response" comprises of bearer resource allocation message pertaining to the respective EPE entities. For e.g., if MME_UE grants bearer resource (x) to the UE (Y), MME_UE generates 'RR Request' message seeking bearer allocation for the relay nodes (P,Q,R) and forwards to MME_RN. The 'RR Request' message may be in the form of Yx(P,Q,R). MME_RN may grant the same resources ('x') to the respective relay nodes (P,Q,R). In such cases "RR Response" message generated by MME_RN may be x(P,Q,R). When this 'RR Response' message is received by MME_UE, MME_UE may generate an "Intersection of Admission Response" in the form of (Y, P, Q, R)(x,x,x,x). This response is understood by the DeNB as a message comprising of allocated bearer resources corresponding to the value of 'x' to UE, and as a message comprising of allocated bearer resources corresponding to the value of 'x' for the relay nodes 'P', 'Q' and 'R' respectively. In the above given example given, in case MME_RN grants bearer resources for each relay node in the sequence P,Q,R, corresponding to the value less than the granted value of UE i.e., 'x-a', then the 'RR Response' message that is generated by MME_RN would be '(P,Q,R)(b,b,b)', (wherein x−a=b). When this 'RR Response' message is received by MME_UE, MME_UE may generate an "Intersection of Admission Response" in the form of '(Y, P,Q,R)(b,b,b,b)'. This "Intersection of Admission Response" is understood by the DeNB as a message comprising of allocated bearer resources corresponding to the value of 'b' to UE, and as a message comprising of allocated bearer resources corresponding to the value of 'b' for the respective relay nodes 'P', 'Q' and 'R'. Further in the given example above, in case MME_RN grants bearer resources for the relay node 'P' corresponding to the value less than the granted value of UE i.e., 'x−d'; and grants bearer resources for the relay node 'Q' corresponding to the value less than the granted value of RN 'P' i.e., 'x−e'; and grants bearer resources for the relay node 'R' corresponding to the value less than the granted value of RN 'Q' i.e., 'x−f' wherein (f<e<d), then the 'RR Response' message that is generated by MME_RN would be '(P,Q,R)(d,e,f)'. When this 'RR Response' message is received by MME_UE, MME_UE may generate an "Intersection of Admission Response" in the form of '(Yx,P,Q,R)(d,d,e,f)'. This "Intersection of Admission Response" is understood by the DeNB as a message comprising of allocated bearer resources corresponding to the value of 'd' to UE, and as a message comprising of allocated bearer resources corresponding to the value of 'd', 'e', and 'f' for each of the relay nodes 'P', 'Q' and 'R' respectively. As illustrated here, Intersection of Admission Response is the intersection of MME_UE grant with that of the MME_RN grant for the UE.

The network nodes MME_UE and MME_RN performing the functions in accordance with the embodiments of the invention are shown in blocks. Block 151 represents the function of granting utmost UE bearer request by the MME_UE. Block 152 represents the function of MME_RN granting utmost RN bearer request. Block 153 represents the function of MME_UE not granting UE bearer request. Block 154 represents the function of MME_RN not granting RN bearer request. Block 157 represents the function of DeNB 30 receiving the "Intersection of Admission response" to RN 10.

If the functions executed in the blocks 151 and 152 are similar (union block 155) i.e, if MME_UE and MME_RN both grants the bearer request of UE and RN respectively then the "IA Response" message that is available to DeNB 30 is "IA Response Accept".

If the functions executed in the blocks 151 and 154 are dissimilar (union block 156) i.e., if MME_RN does not grant the RN 10 bearer request then the "IA Response" message that is available to DeNB 30 is "IA Response Reject"

It is to be noted that if the MME_UE does not grant UE bearer request then the message that is available to DeNB is 'UE NAS message for bearer resource reject'. Block 158 is the function of DeNB 30 receiving one among the available "Implicit admission responses" and 'UE NAS message for bearer resource reject'.

Figure 7:
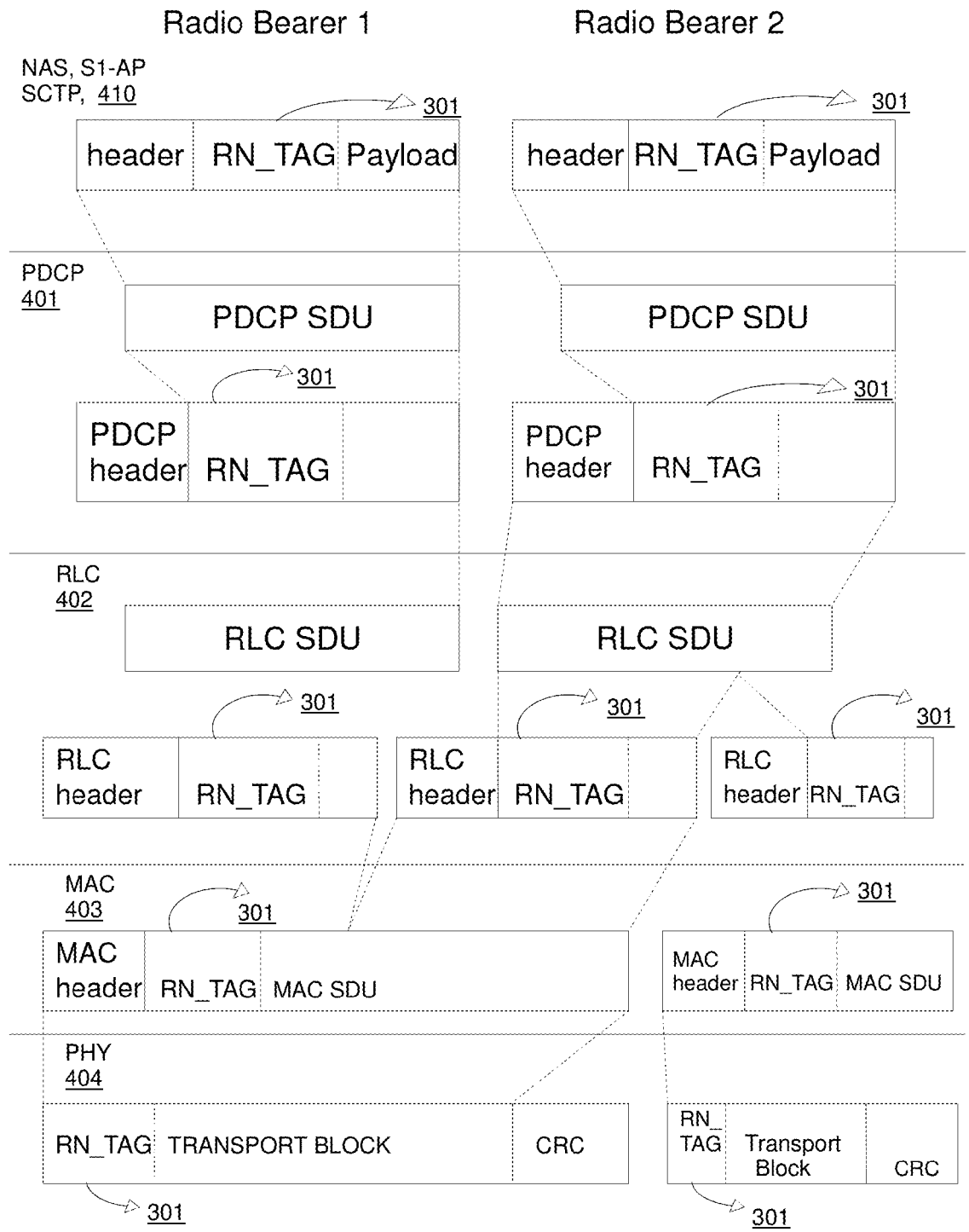
FIG. 7 shows a detailed method of relay node identity tagging (RN_TAG) in any one of the control plane protocol layers in accordance with the embodiments of the invention.

FIG. 7 depicts protocol layers through which insertion of RN_TAG (comprising of RN_ID and type prefix for the said RN_ID) by the RN 10 preferably at any one of the control plane protocol layers of NAS, S1-AP, and SCTP or at any one of the other control plane protocol layers like, PDCP, RLC, MAC, PHY, is accomplished in accordance with the embodiments of the invention. For the sake of illustration the flow of uplink signalling data in case of two radio bearers is shown with possible RN_TAG insertion points, at any one of the protocol layers. For the sake of brevity, the control plane protocol layer 410 above PDCP layer 401 is shown as an integrated layer comprising of NAS, S1-AP, and SCTP (Stream Control Transmission Protocol).

The PDCP layer 401 performs IP-header compression and ciphering. A PDCP header is added, carrying information required for deciphering in the UE. The output from the PDCP is forwarded to the RLC layer 402. The RLC protocol performs concatenation and/or segmentation of the PDCP Service Data Units (SDUs) and adds an RLC header. The RLC Service Data Units (PDUs) are forwarded to the MAC layer 403, which multiplexes a number of RLC SDUs and attaches a MAC header to form a transport block. Finally the Physical layer 404 attaches a CRC (Cyclic Redundancy Check) to the transport block for error-detection purposes and transmits the resulting signal using transmit antennas. In the above protocol structure, possible insertion of RN_TAG 301 (shown by arrow headers) could be at any one of the layers. For eg., RN_TAG 301 can be preferably inserted at header junction of layer 410, or at PDCP header junction of layer 401, or at RLC header junction of layer 402 or at MAC header junction of layer 403 or at any junction of the PHY layer 404. Similarly for each radio bearer signalling flow a possible RN_TAG 301 could be inserted at any one of the protocol layers as explained above.

Figure 8:
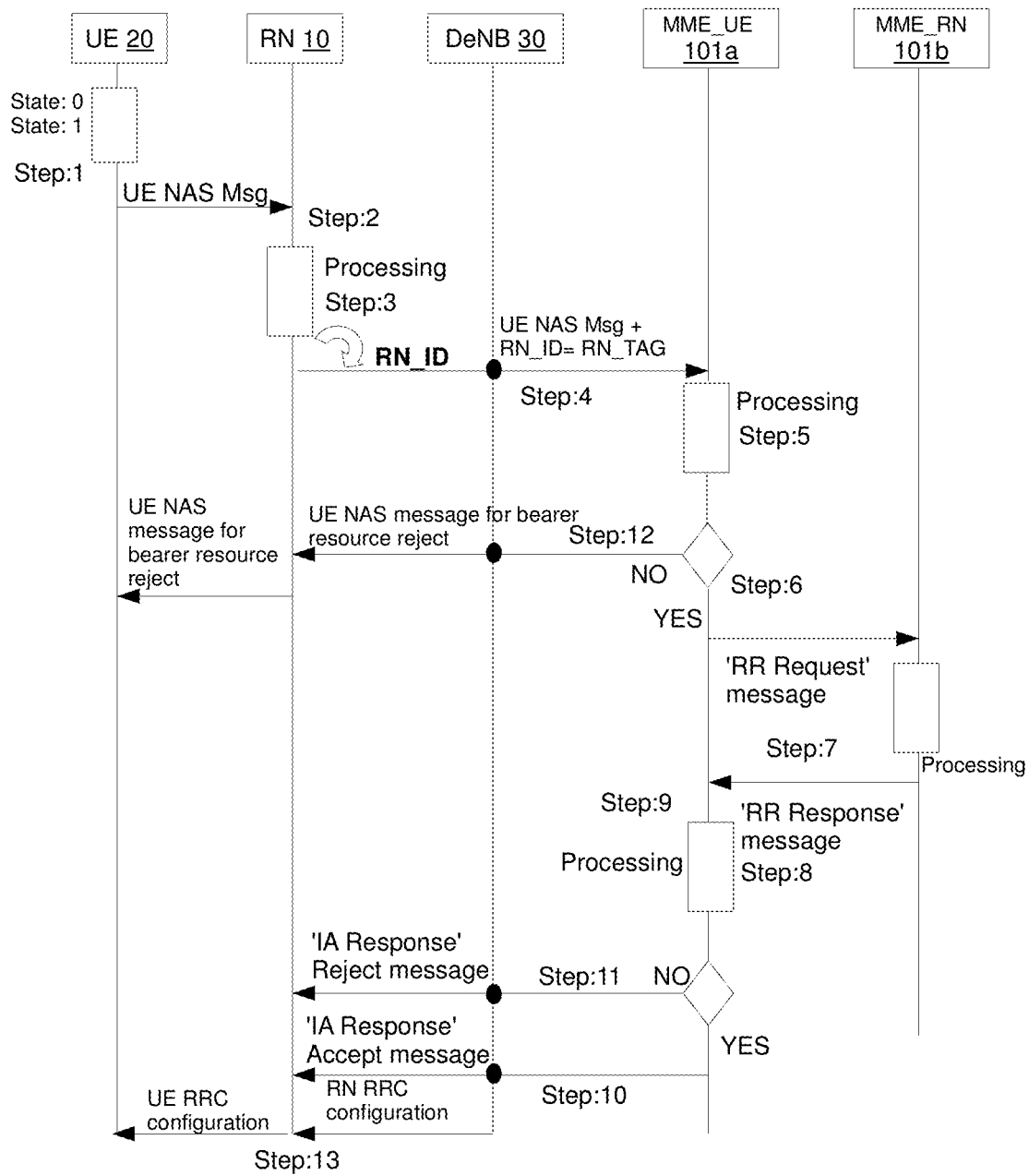
FIG. 8 represents bearer establishment signalling loop in accordance with various aspects of the invention.

FIG. 8 represents bearer setup signalling loop, with a single transportation of 'UR Request' signalling message by EPE entities and receiving one "IA Response" signalling message by DeNB over uplink and downlink channels respectively, in accordance with the embodiments of the present invention. For the sake of simplicity, UE coupled with one RN is shown. When the UE 20 is in the state of RRC_CONNECTED (1) or RRC_IDLE (0), (Step 1) CRUD messages are generated by UE or initiated by EPC. In either case, UE 20 generates either single or multiple bearers within a single NAS message thereby triggering the establishment of RRC connection with the RN 10. RN 10 also starts the establishment of the RRC connection with the DeNB 30. Both these RRC procedures over the respective Uu and Un interface are elaborated in 3GPP specification TS 36.331.

When the RN 10 receives the UE NAS Message (Step 2), from UE 20, the RN 10 adds (Step 3) the received 'UE NAS Message' with the identity of the said relay node 'RN_ID' to be sent to the MME_UE 101a via Donor eNB 30. The denotation 'UE NAS Msg+RN_ID' means that it is a tagged message essentially consisting of UE NAS Message and RN 10 Identity (Step 4). The above denotation is specifically defined for the purpose of this invention as a tagged message denoted as RN_TAG. The RN_TAG is then transmitted from the RN 10 to the MME_UE 101a via DeNB 30 over Un interface as a control plane signalling message. When this RN_TAG arrives at DeNB 30, DeNB 30 understands the message to be a 'RN_TAG' message and then forwards it to MME_UE 101a; the MME_UE 101a, understands the message (Step 5) and if the 'UE NAS Message' is CRUD message then the MME_UE 101a processes UE 20 bearer request and grants the request. The granted UE 20 bearer request and the RN 10 identity is then stored in the MME_UE 101a. (In case of multiple relay nodes in sequence, all the identities of the respective relay nodes are stored). Thereafter a relay node resource request (RR Request) message is generated, to be sent to MME_RN 101b (Step 6). (In case of multiple relay nodes in sequence, 'RR Request' message comprises of bearer resource request for the respective relay nodes). If the MME_UE 101a finds that the UE NAS Message does not pertain to UE 20 bearer request, then the UE NAS Message is handled as 'other control plane signalling message'. If the MME_UE 101a does not grant UE 20 bearer request, then MME_UE 101a generates 'UE NAS message for bearer resource reject' and forwards it for UE 20 via DeNB 30 (Step 12).

The 'RR Request' message generated by the MME_UE 101a for MME_RN 101b is a bearer request on behalf of RN 10. The message essentially is an establishment of RN bearer to serve UE bearer QoS requirements. (For eg., the 'RR Request' message may be that, some bandwidth is guaranteed for the UE 20 which is being served by the RN 10 (RN_ID). Hence MME_RN 101b is required to process RN 10 bearer management) (Step 7). The 'RR Request' is then forwarded to MME_RN 101b.

Once RN 10 bearer request is granted, MME_RN 101b generates 'RR Response Positive Ack', and then forwards it to MME_UE 101a. If the MME_RN 101b does not grant 'RR Request' made by MME_UE 101a, then MME_RN 101b generates 'RR Response Negative Ack', and then forwards it to MME_UE 101a (Step 8). MME_UE 101a receives the 'RR Response' from the MME_RN 101b and understands it. 'RR Response' message received from MME_RN 101b is interpreted by MME_UE 101a (Step 9) and if the message received is 'RR Response Positive Ack', from the MME_RN 101b, then MME_UE generates "IA Response Accept" message (Step 10). If the message received from MME_RN 101b is an 'RR Response Negative Ack', then MME_UE generates a "IA Response Reject" message (Step 11). RRC procedures (Step 13) are similar to the procedures as elaborated in 3GPP specification TS 36.331. Intersection of Admission responses forwarded by MME_UE 101a to UE via DeNB may be multiplexed, encapsulated or concatenated.

Figure 9:
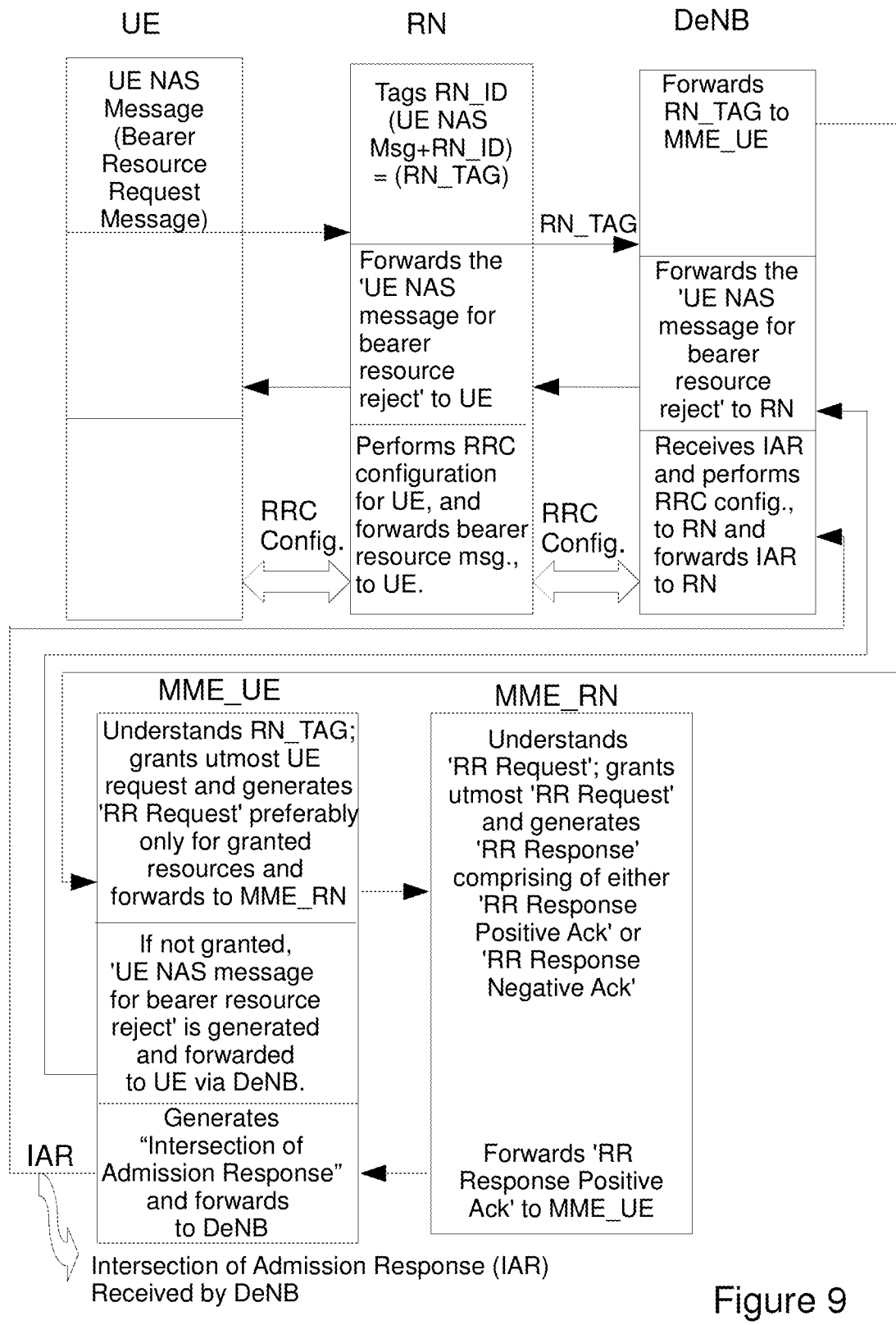
FIG. 9 depicts the function of bearer establishment signalling loop for an UE coupled with a Relay Node (RN) in accordance with the embodiments of the invention.

FIG. 9 illustrate the function of bearer establishment signalling loop for an UE coupled with a relay node in accordance with the embodiments of the invention. In such case, the 'RR Request' is received and understood by the MME_RN 101b. MME_RN 101b has complete knowledge of bandwidth usage at the RN. Then, based on the bandwidth requirement, bandwidth usage of the RN and maximum bandwidth limit for the RN 10, MME_RN 101b processes 'RR Request' (RN bearer request) made by MME_UE 101a and generates and forwards 'RR Response positive Ack' to MME-UE. Once MME_UE generates "IA Response Accept" message it forwards to DeNB. "IA Response Accept" message as received by the DeNB comprises of 'S1-AP message for UE', and 'S1-AP message for RN'. DeNB performs RRC configuration for the said RN and then forwards "IA Response Accept" message to the said RN. "IA Response Accept" message received by the RN is different from the "IA Response Accept" message received at the DeNB. The "IA Response Accept" message received at RN is "IA Response Accept" message received at the DeNB without 'bearer configuration' for the said RN. This is so because the S1-AP bearer configuration message for the said RN has been already used by the DeNB. "IA Response Reject" message as received by the DeNB comprises of S1-AP message for UE, and 'RN NAS message for bearer resource reject'. DeNB forwards "IA Response Reject" message to RN. RN may use the S1-AP message for UE to do RRC configuration (not shown in FIG. 9).

Figure 10:
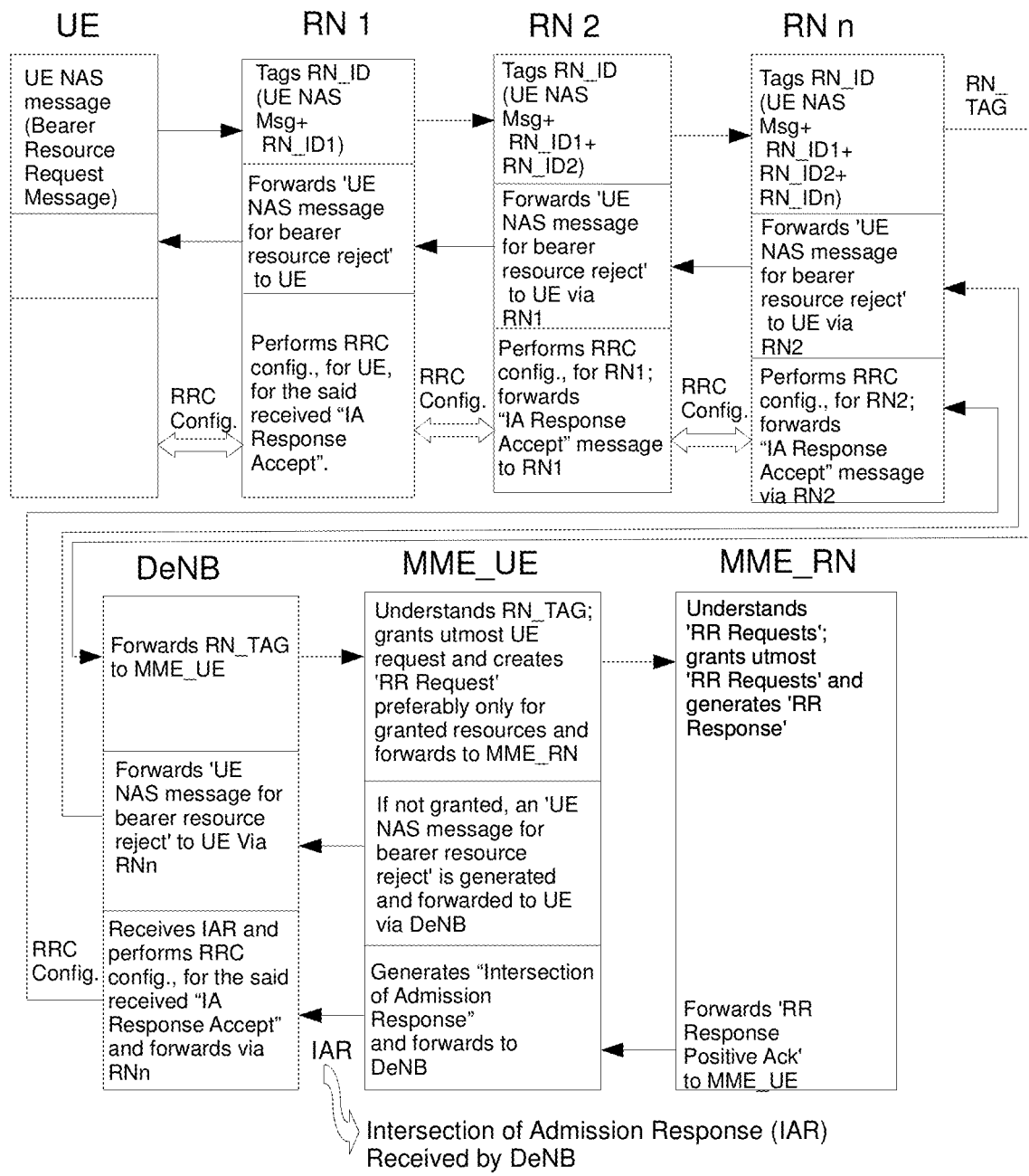
FIG. 10 depicts the function of bearer establishment signalling loop for an UE coupled to Relay Nodes, in accordance with the embodiments of the invention.

FIG. 10 depicts the function of bearer establishment signalling loop for an UE coupled to relay nodes in sequence, in accordance with the embodiments of the invention. In such case, the 'RR Request' is received and understood by the MME_RN 101b. MME_RN 101b has complete knowledge of bandwidth usage of all the relay nodes (for eg., RN1, RN2 & RNn). Then, based on the bandwidth requirement, bandwidth usage of the relay nodes and maximum bandwidth limit for the relay nodes, MME_RN 101b processes the bearer request for all the relay nodes (RN1, RN2 & RNn). In such cases MME_RN generates 'RR Response Positive Ack' message and forwards to MME_UE. MME_UE generates "IA Response Accept" message and forwards it to DeNB. "IA Response Accept" message as received by DeNB comprises of: 'S1-AP message for UE' and 'S1-AP message for RNs' (RN1, RN2 & RNn). DeNB performs RRC configuration for the said downstream RNn and then forwards "IA Response Accept" message to the said RNn. "IA Response Accept" message received by the said downstream RNn is different from the "IA Response Accept" message received at the DeNB. The "IA Response Accept" message received by the downstream RNn is "IA Response Accept" message received at the DeNB without 'bearer configuration' for the said downstream RNn. This is so because the S1-AP bearer configuration message for the said downstream RNn has been already used by the DeNB.

Similarly, the said downstream RNn performs RRC configuration for its downstream RN2 and forwards "IA Response Accept" message to it. The "IA Response Accept" message received by the downstream RN2 is "IA Response Accept" message received at the RNn, without 'bearer configuration' for the said downstream RN2. This is so because the S1-AP bearer configuration message for the said downstream RN2 has already been used by the RNn.

Similarly, the said downstream RN2 performs RRC configuration for its downstream RN1 and forwards "IA Response Accept" message to it. The "IA Response Accept" message received by the downstream RN1 is "IA Response Accept" received by the RN2 without 'bearer configuration' for the said downstream RN1. This is so because the S1-AP bearer configuration message for the said downstream RN1 has been already used by the RN2. Thereafter RN1 being the first upstream node for the said UE performs RRC configuration for the 'S1-AP message for UE' and forwards bearer configuration message to UE.

The MME_RN may not grant bearer resources for all the relay nodes (for e.g., RN1, RN2 & RNn) in the sequence. In such cases MME_RN generates 'RR Response Negative Ack' message and forwards to MME_UE. MME_UE generates "IA Response Reject" message and forwards it to DeNB. "IA Response Reject" message as received by DeNB comprises of: 'S1-AP message for UE' and 'RN NAS message for bearer resource reject' for all the RNs' (RN1, RN2 & RNn). DeNB forwards the received "IA Response Reject" to the said downstream RNn (not shown in FIG. 10)

The MME_RN may grant the bearer resources for some relay nodes (for e.g., RNn & RN2) and for some (for e.g., RN1), bearer resource is not granted. In such cases "IA Response Reject" message generated by MME_UE comprises of: 'S1-AP message for UE', 'S1-AP message for RN' for which the resources are granted, and 'RN NAS message for bearer resource reject' for which bearer resources are not granted. The S1-AP message for RN (i.e., RNn) may be used by the DeNB for RRC reconfiguration of the said RNn, and forward "IA Response Reject" to RNn. The "IA Response Reject" message received by RNn is "IA Response Reject" received by the RNn without 'bearer configuration' for the said RNn. This is so because the S1-AP bearer configuration message for the said downstream RNn has been already used by the DeNB for RRC reconfiguration of the said RNn. The S1-AP message for RN (i.e., RN2) may be used by the RNn for RRC reconfiguration of the said RN2 and forward "IA Response Reject" to RN2. The "IA Response Reject" message received by RN1 is "IA Response Reject" received by the RN2 without 'bearer configuration' for the said downstream RN2. This is so because the S1-AP bearer configuration message for the said downstream RN2 has already been used by the RNn for RRC reconfiguration of the said RN2. The "IA Response Reject" message received by RN1 further contains 'RN NAS message for bearer resource reject' for RN1. RN1 forwards "IA Response Reject" to UE comprising only of 'S1-AP message for UE' (not shown in FIG. 10).

FIGS. 11 to 16 are flow chart diagrams sequentially arranged (1 to 6) depicting the functionality of the nodes RN 10, DeNB 30, MME_UE 101a, MME_RN 101b, in accordance with the embodiments of the invention.

Figure 11:
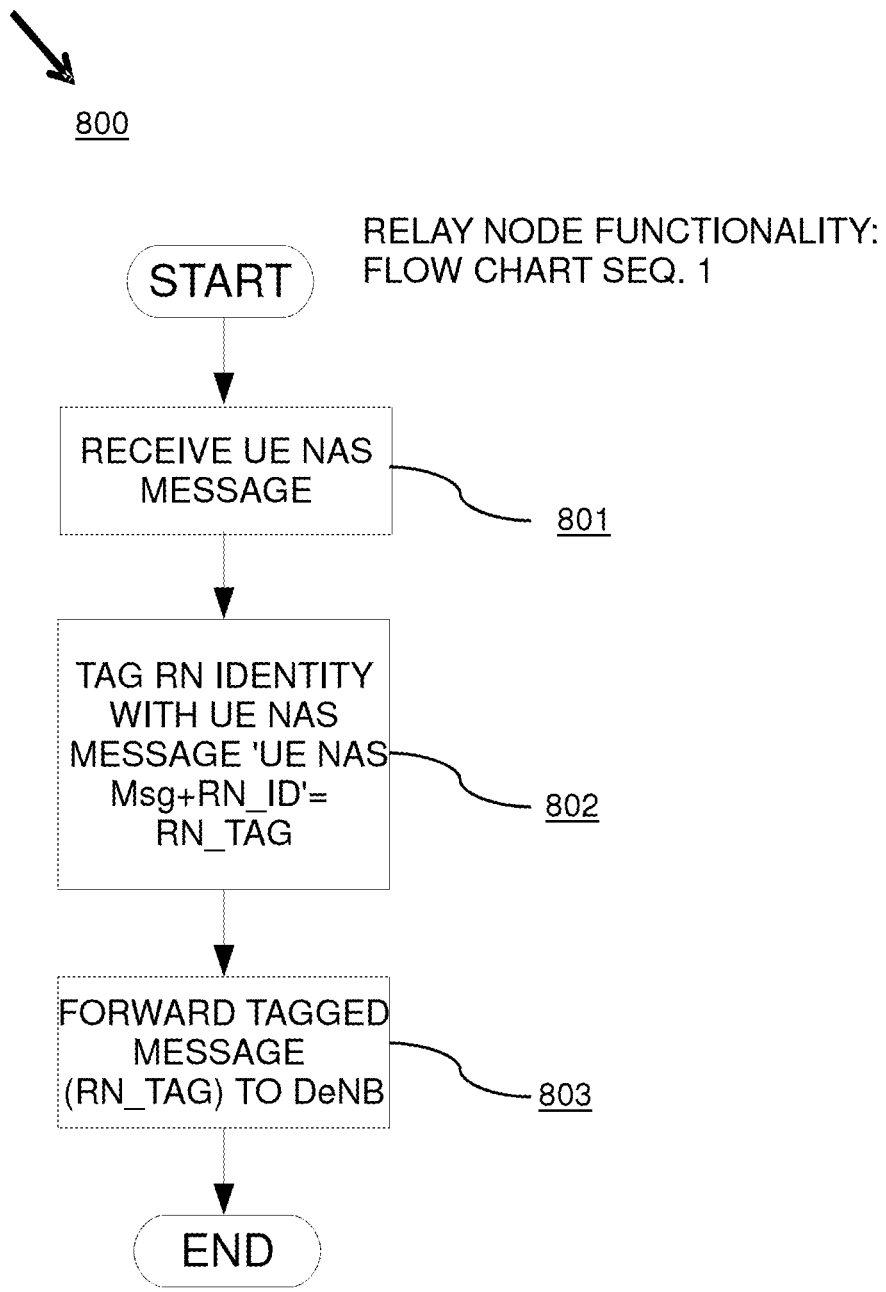
FIG. 11 is the first sequence flowchart of the functions performed by the relay node in accordance with the embodiments of the invention.

FIG. 11 represents the functionality 800 of the Relay Node 10 in accordance with the embodiments of the invention. As described above, the embodied functionality of RN 10 begins at 801 wherein it receives UE NAS Message and at 802, irrespective of what UE NAS message contains, RN 10 add its own identity (RN_ID) to form a tagged message consisting of 'UE NAS Msg+RN_ID' and at 803 forwards the tagged message to DeNB 30. In case of multiple relay nodes coupled to UE in a sequence, each relay node performs the function of adding its own identity (RN_ID), until finally RN_TAG message is forwarded to DeNB, as shown towards right in FIG. 5. RN 10 functionality sequence 1 ends at this stage.

Figure 12:
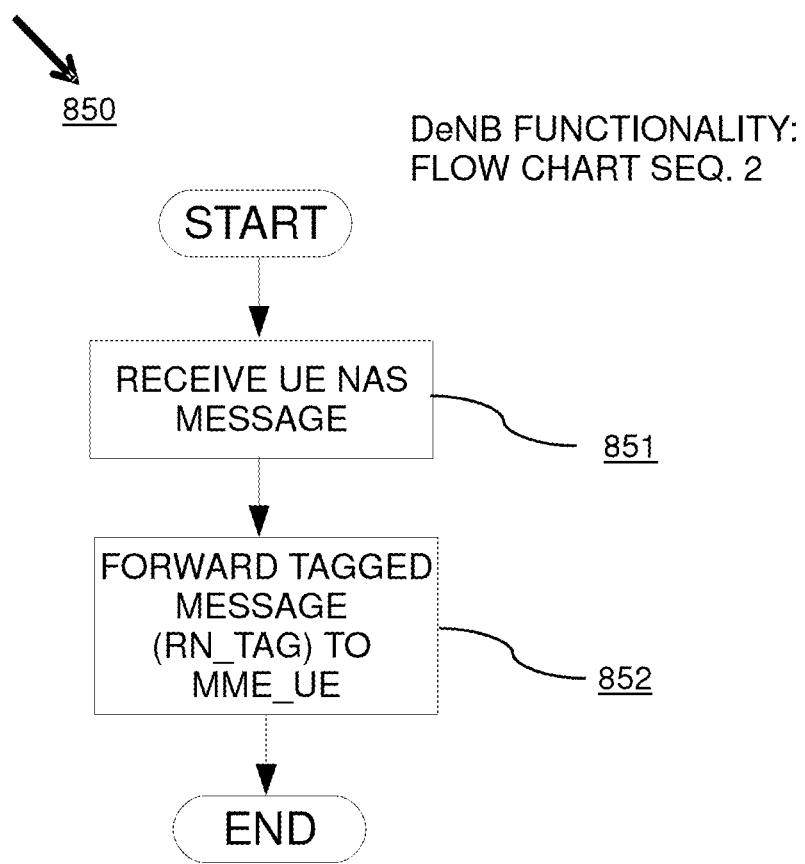
FIG. 12 is the second sequence flowchart of the functions performed by Donor eNB, in accordance with the embodiments of the invention

FIG. 12 represents the functionality 850 of the DeNB 30 as a sequel to RN 10 functionality 800 in accordance with the embodiments of the invention. The embodied functionality of DeNB 30 begins at 851, wherein it receives the RN_TAG message from RN 10 and at 852 forwards to MME_UE. DeNB 30 functionality at sequence 2 ends at this stage.

Figure 13:
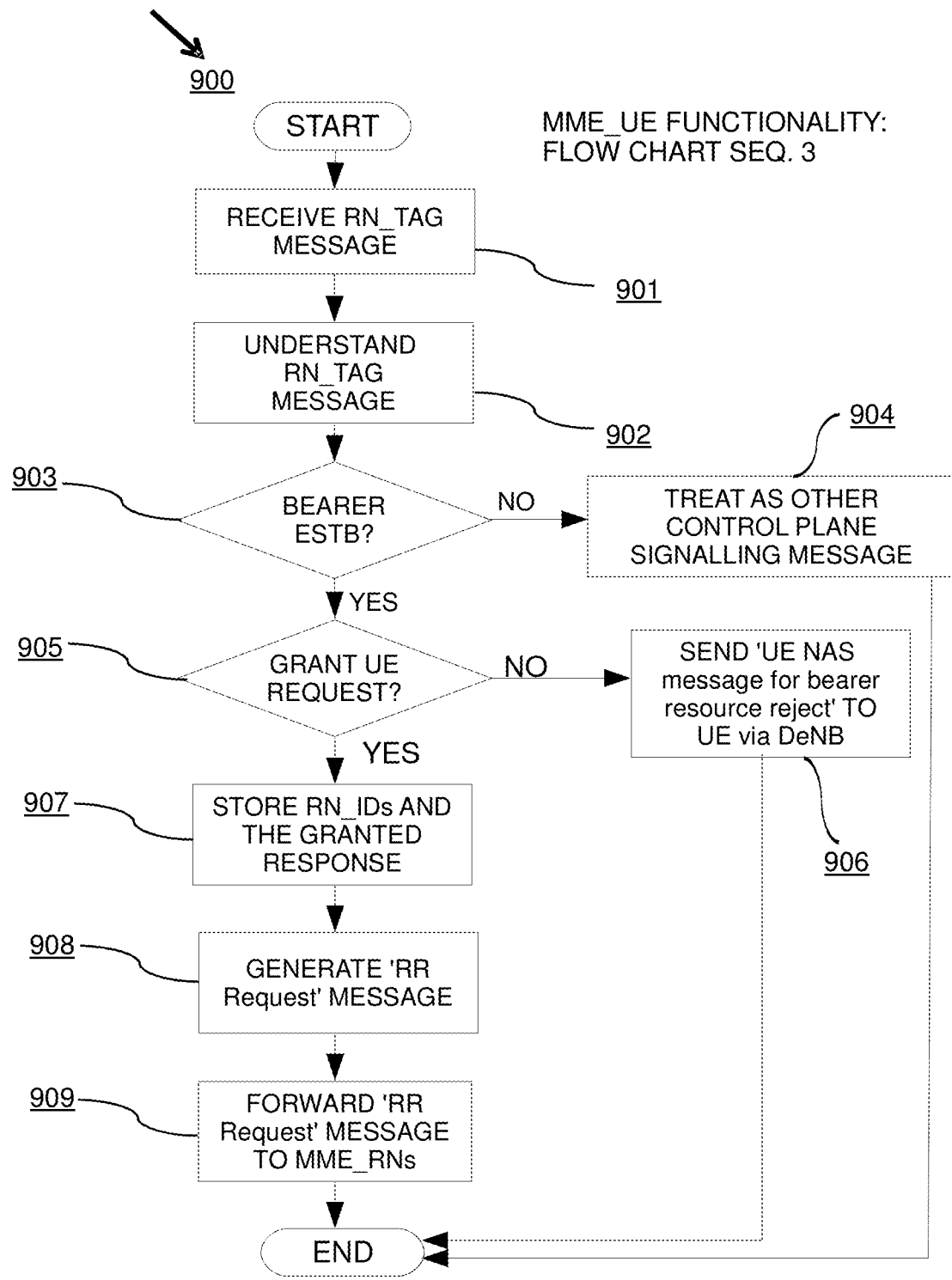
FIG. 13 is the third sequence flowchart of the functions performed by the mobility management entity serving the UE (MME_UE) in accordance with the embodiments of the invention.

FIG. 13 represents the functionality 900 of the MME_UE 101a as a sequel to DeNB 30 functionality 850, in accordance with the embodiments of the invention. As explained above, the embodied functionality of MME_UE 101a begins at 901, wherein it receives the RN_TAG message from DeNB 30 and at 902 understands the message. At 903, it determines if the received message is a RN_TAG message seeking for bearer establishment of UE 20. If the received message is not a RN_TAG message, then it treats it as 'other control plane signalling message' as shown in 904. If the received message is a RN_TAG message, seeking for bearer establishment of UE 20, at 905 it grants the bearer request of UE and at 907, stores the RN 10 Identity and the granted UE resource request. And then it generates a 'RR Request' message as shown in 908. The 'RR Request' message generated for MME_RN 101b is a bearer request on behalf of RN 10. The 'RR Request' message is then forwarded to MME_RN 101b as shown in 909. At 905, if the resource request of UE 20 is not granted, then at 906 a 'UE NAS message for bearer resource reject' is generated and forwarded to UE 20 via DeNB 30. MME_UE 101a functionality sequence 3 ends at this stage.

Figure 14:
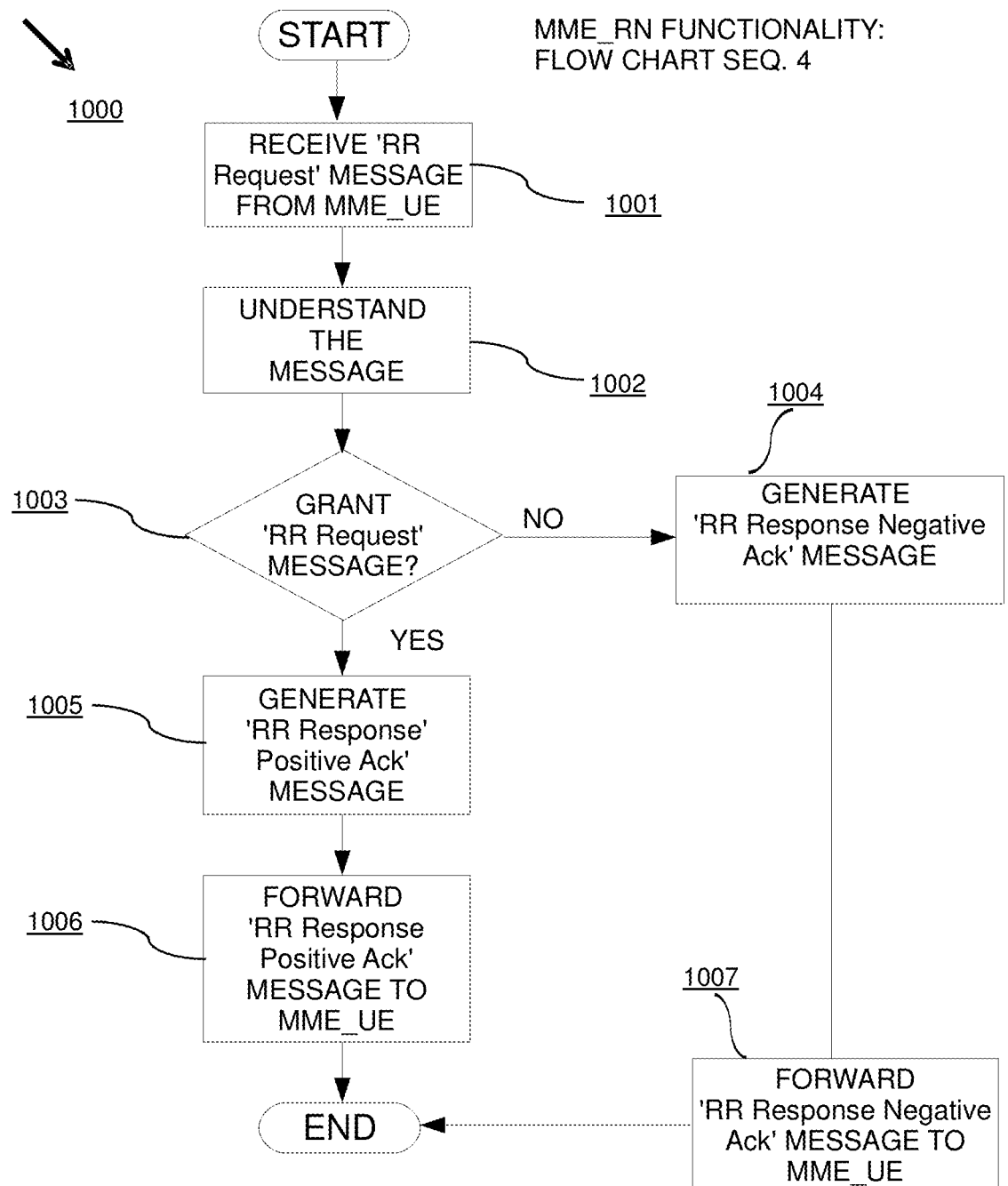
FIG. 14 is the fourth sequence flowchart of the functions performed by the mobility management entity serving the RN (MME_RN) in accordance with the embodiments of the invention.

FIG. 14 represents the functionality 1000 of the MME_RN 101b as a sequel to MME_UE 101a functionality 900 in accordance with the embodiments of the invention. As explained above, the embodied functionality of MME_RN 101b begins at 1001, wherein it receives 'RR Request' message. The received 'RR Request' message may also be a resource request for relay nodes or it may be for a single relay node coupled to a UE. In either case, at 1002 MME_RN 101b understands the message. At 1003, it determines to grant RN bearer request based on the bandwidth requirement, bandwidth usage of the RN and maximum bandwidth limit for the RN, as it has complete knowledge of bandwidth usage at the RN. Once RN or relay nodes bearer request is granted, an 'RR Response Positive Ack' message is generated at 1005 and then it is forwarded to MME_UE 101a at 1006. If RN or relay nodes bearer request made by MME_UE 101a is not provisioned at 1003, then one 'RR Response Negative Ack' message is generated at 1004 and then forwarded to MME_UE 101a at 1007. MME_RN 101b functionality sequence 4 ends at this stage.

Figure 15:
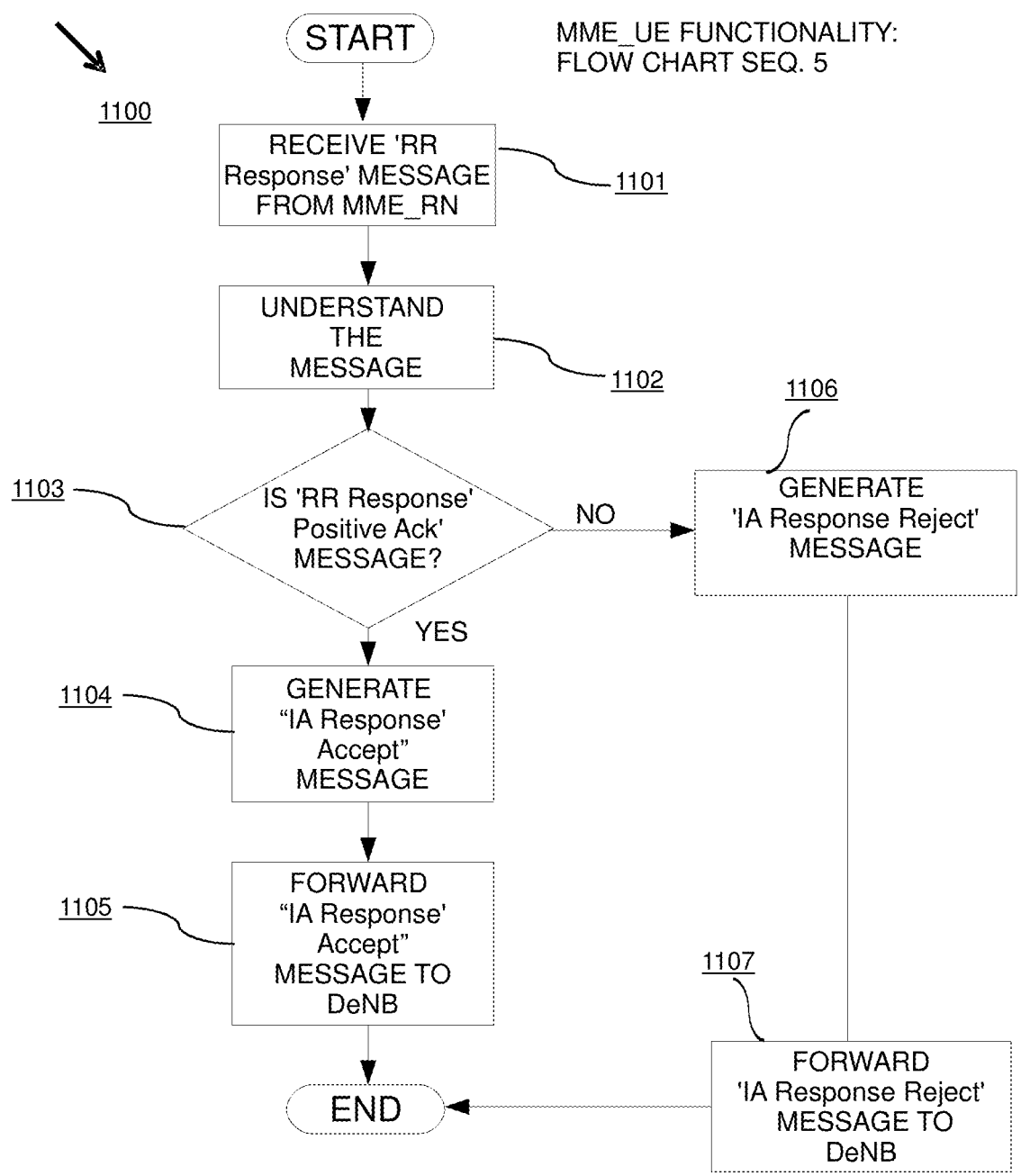
FIG. 15 is the fifth sequence flowchart of the functions performed by the mobility management entity serving the UE (MME_UE) in accordance with the embodiments of the invention.

FIG. 15 represents the functionality 1100 of the MME_UE 101a as a sequel to MME_RN 101b functionality 1000 in accordance with the embodiments of the invention. As explained above, the embodied functionality of MME_UE 101a in the fifth sequence begins at 1101, wherein it receives 'RR Response' message from the MME_RN 101b and at 1102 understands it. At 1103, 'RR Response' message received from MME_RN 101b is interpreted. If the message received is 'RR Response Positive Ack' message, then at 1104, MME_UE 101a generates an "IA Response Accept" message. At 1105, the above message is forwarded to DeNB 30. If the 'RR Response' message received from MME_RN 101b is a 'RR Response-Negative Ack' message, then at 1106 MME_UE 101a generates an 'IA Response-Reject' message. At 1107 the above message is forwarded to DeNB 30. MME_UE 101a functionality sequence 5 ends at this stage.

Figure 16:
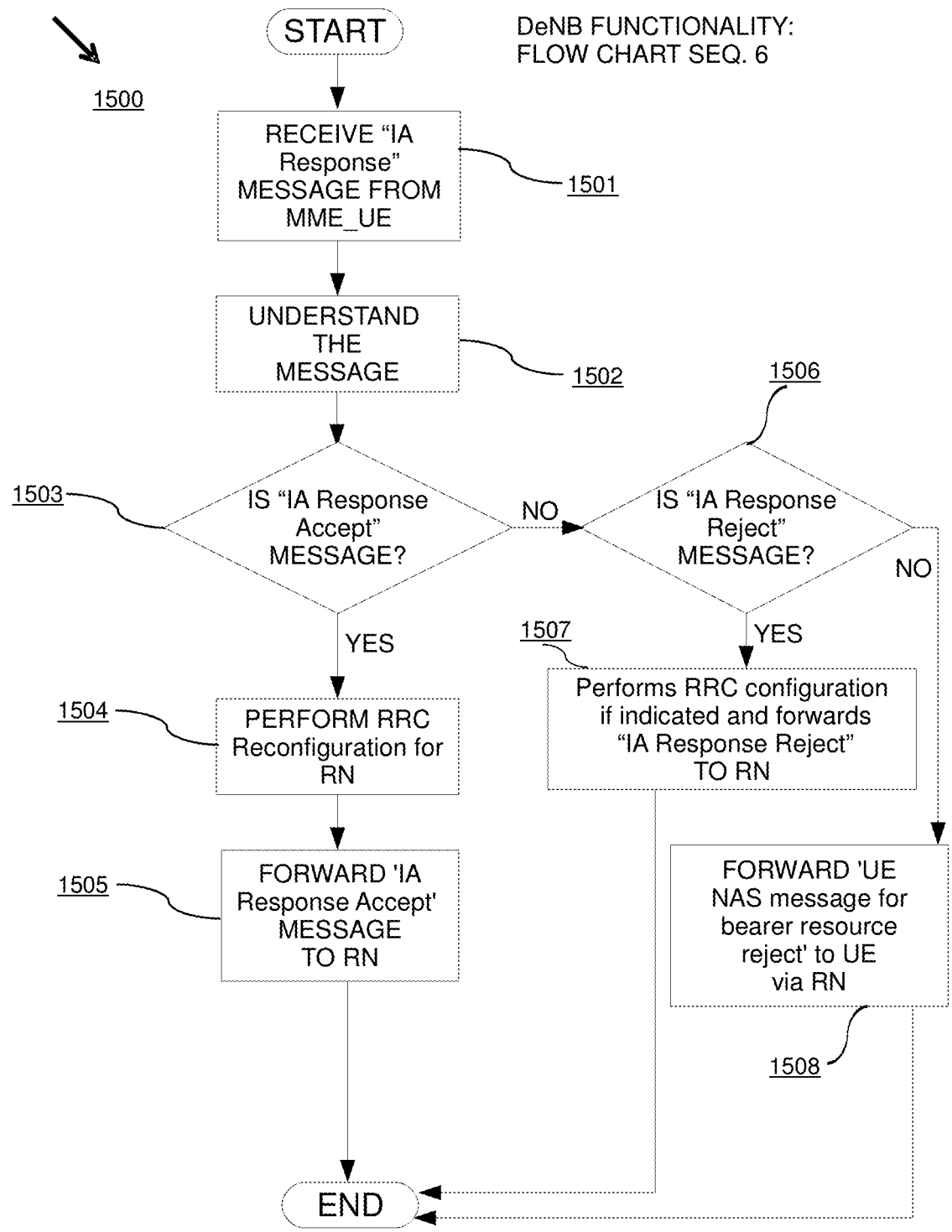
FIG. 16 is the sixth sequence flowchart of the functions performed by Donor eNB, in accordance with the embodiments of the invention

FIG. 16 represents the functionality 1500 of the DeNB 30 as a sequel to MME_UE 101a functionality 1100 in accordance with the embodiments of the invention. As explained above, the embodied functionality of DeNB 30 in the sixth sequence begins at 1501, wherein it receives "IA Response" message from the MME_UE 101a and at 1502 understands it. At 1503, "IA Response" message received from MME_UE 101a is interpreted. If the message received is "IA Response Accept" message, then at 1504, DeNB 30 performs RRC configuration for the relay node and at 1505 forwards the "IA Response Accept" to RN. At 1503, when the DeNB 30 finds that the received message is not an "IA Response Accept" message then at 1506, it interprets whether the received message is "IA Response Reject". If the received message is "IA Response Reject" then at 1507 DeNB performs RRC configuration, if indicated, and forwards "IA Response Reject" message to RN. When the DeNB 30 finds that at 1506 the received message is not "IA Response Reject" message, then at 1508, it forwards 'UE NAS message for bearer resource reject' to RN.

FIGS. 17 to 20 depict systems that can enable the above aspects of the disclosed subject matter. Such systems can include functional blocks, which can be functional blocks that represent functions implemented by a processor or an electronic machine, software or combination thereof.

Figure 17:
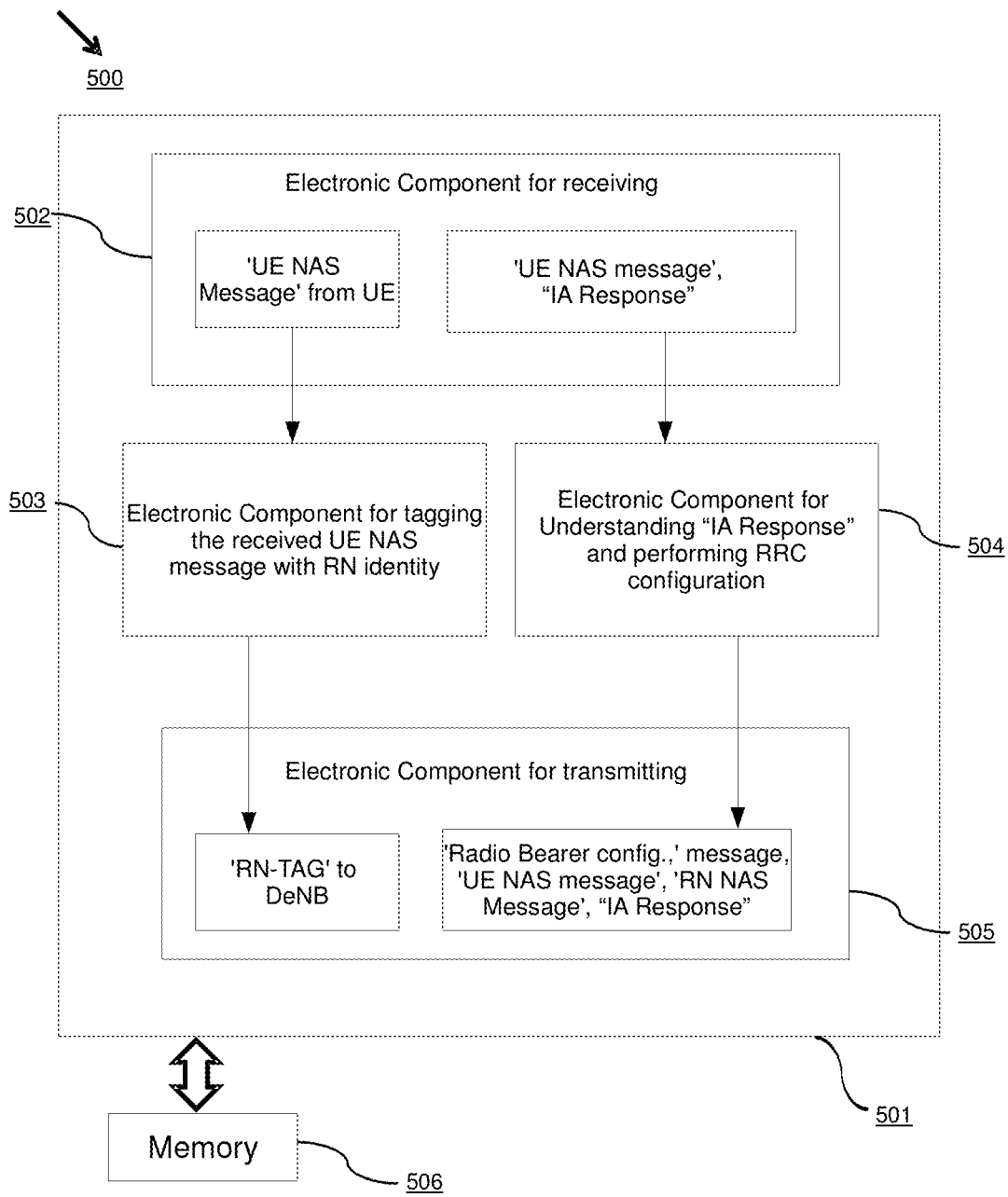
FIG. 17 illustrates a system diagram of various components of devices within a relay node, in accordance with the embodiments of the invention.

FIG. 17 illustrates a block diagram of an example system 500 that enables relay node functions in accordance with aspects disclosed in the subject specification. System 500 can reside at least partially within a relay node. System 500 includes a logical grouping 501 of electronic components that can act in conjunction. In an aspect of the subject innovation, logical grouping includes an electronic component 502 for receiving 'UE NAS Message' and "IA Response" message or 'UE NAS message'; an electronic component 503 for adding the received UE NAS Message with the RN Identity and inserting RN_TAG message at any one of the control plane protocol layers preferably on NAS, S1-AP, SCTP layers; an electronic component 504 for understanding "IA Response" message and performing RRC configuration; an electronic component 505 for transmitting RN_TAG message that consists of UE NAS Message and the RN Identity to DeNB and transmitting 'radio bearer configuration message', 'UE NAS message', 'RN NAS message', and 'IA Response'. System 500 may also include a memory 506 that retains instructions for executing functions associated with electrical components 502, 503, 504, and 505, as well as measured or computed data that may be generated during executing such functions.

Figure 18:
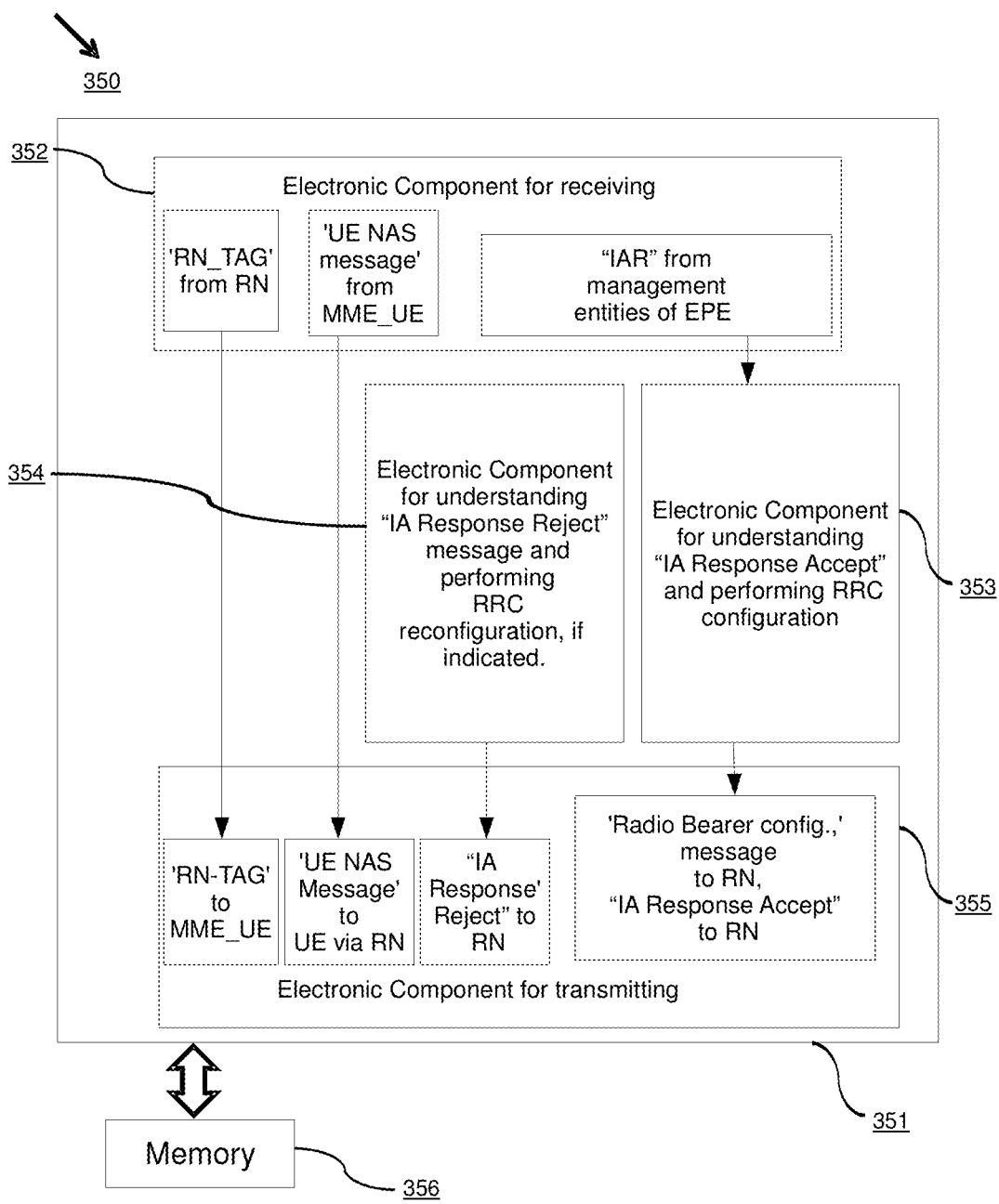
FIG. 18 illustrates a system diagram of various components of devices within Donor eNB, in accordance with the embodiments of the invention.

FIG. 18 illustrates a block diagram of an example system 350 that enables DeNB 30 functions in accordance with aspects disclosed in the subject specification. System 350 can reside at least partially with a DeNB. System 350 includes a logical grouping 351 of electronic components that can act in conjunction. In an aspect of the subject innovation, logical grouping includes an electronic component 352 for receiving RN_TAG from RN and receiving at least any one of 'UE NAS message' or "IA Response" from management entities of EPE; an electronic component 353 for understanding "IA Response Accept" and performing RRC reconfiguration; an electronic component 354 for understanding the received "IA Response Reject" message from management entities of EPE and performing RRC reconfiguration, if indicated; an electronic component 355 for transmitting RN_TAG to MME_UE, radio bearer configuration message to RN, "IA Response Accept", "IA Response Reject" to RN. System 350 may also include a memory 356 that retains instructions for executing functions associated with electronic components 352, 353, 354 and 355 as well as measured or computed data that may be generated during executing such functions.

Figure 19:
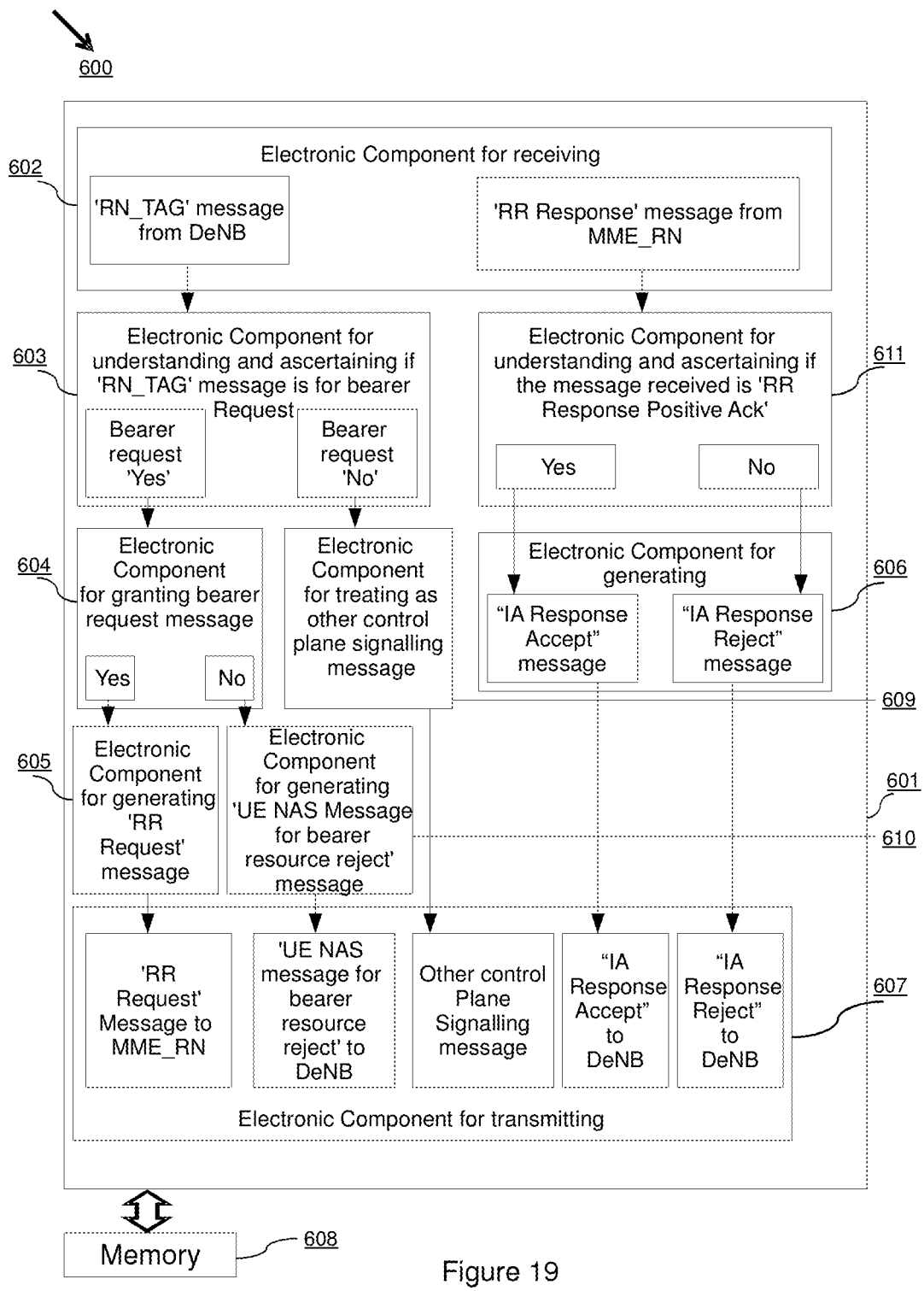
FIG. 19 illustrates a system diagram of various components of devices within MME_UE, in accordance with the embodiments of the invention.

FIG. 19 illustrates a block diagram of an example system 600 that enables MME_UE 101a functions in accordance with aspects disclosed in the subject specification. System 600 can reside at least partially with a MME_UE. System 600 includes a logical grouping 601 of electronic components that can act in conjunction. In an aspect of the subject innovation, logical grouping includes an electronic component 602 for receiving RN_TAG message from DeNB and 'RR Response' from MME_RN; an electronic component 603 for understanding and ascertaining the RN_TAG message is for bearer request; an electronic component 604 for granting UE resource request if the RN_TAG message is for bearer request; an electronic component 605 for generating a 'RR Request' message seeking bearer establishment for RN if UE resource request is granted; an electronic component 610 for generating a 'UE NAS message for bearer resource reject' message if UE resource request is not granted; an electronic component 609 for treating RN_TAG message as 'other control plane signalling message' if RN_TAG message is not for bearer request; an electronic component 611 for understanding and ascertaining if the 'RR Response' message received from MME_RN is 'RR Response Positive Ack'; an electronic component 606 for generating "IA Response Accept" message if the received message is 'RR Response Positive Ack' and generating "IA Response Reject" message if the received message is not 'RR Response Positive Ack'; and an electronic component 607 for transmitting 'RR Request' message to MME_RN, transmitting 'UE NAS message for bearer resource reject' to DeNB, transmitting other control plane signalling message, transmitting "IA Response Accept" message to DeNB and transmitting "IA Response Reject" message to DeNB. System 600 may also include a memory 608 that retains instructions for executing functions associated with electrical components 602, 603, 604, 605, 606, 607, 609, 610, 611 storing granted UE resource request and RN Identity, as well as measured or computed data that may be generated during executing such functions.

Figure 20:
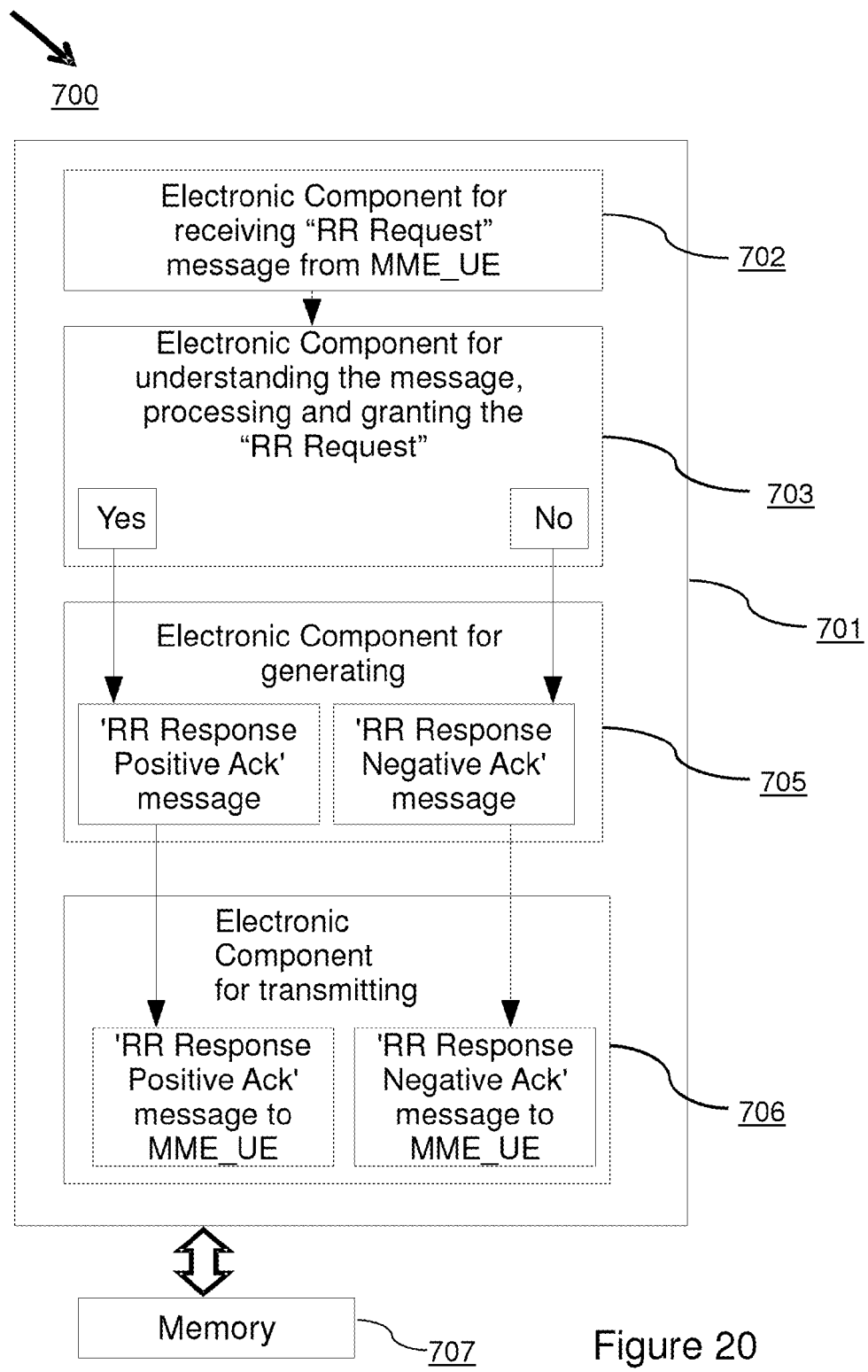
FIG. 20 illustrates a system diagram of various components of devices within the MME_RN, in accordance with the embodiments of the invention.

FIG. 20 illustrates a block diagram of an example system 700 that enables the MME_RN 101*b* functions in accordance with aspects disclosed in the subject specification. System 700 can reside at least partially within a MME_RN. System 700 includes a logical grouping 701 of electronic components that can act in conjunction. In an aspect of the subject innovation, logical grouping includes an electronic component 702 for receiving 'RR Request' message from MME_UE; an electronic component 703 for understanding, processing the 'RR Request' message and granting 'RR Request'; an electronic component 705 for generating 'RR Response Positive Ack' if RN resource request is granted and generating 'RR Response Negative Ack' if RN resource request is not granted; and an electronic component 706 for transmitting either 'RR Response Positive Ack' or 'RR Response Negative Ack' to MME_UE. System 700 may also include a memory 707 that retains instructions for executing functions associated with electrical components 702, 703, 705 and 706, as well as measured or computed data that may be generated during executing such functions Memory 506, 356, 608 and 707 described above can be any storage device including any kind of computer readable storage media, for example, RAM, EPROM, EEPROM, flash memory, registers, hard disks, CD-ROM, DVD, etc.

Another embodiment of the invention relates to the implementation of the above described various embodiments using hardware and software. It is recognized that the various embodiments of the invention may be implemented or performed using computing devices (processors). A computing device or processor may for e.g., be general purpose processors, digital signal processors (DSP), application specific integrated circuits (ASIC), field programmable gate arrays (FPGA) or other programmable logic devices, etc. The various embodiments of the invention may also be performed or embodied by a combination of these devices.

Further, the various embodiments of the invention may also be implemented by means of software modules, which are executed by a processor or directly in hardware. Also a combination of software modules and a hardware implementation may be possible. The software modules may be stored on any kind of computer readable storage media, for example RAM, EPROM, EEPROM, flash memory, registers, hard disks, CD-ROM, DVD, etc.

It is to be noted that respective functional blocks or elements according to above-described aspects can be implemented by any known means, either in hardware and/or software, respectively, if it is only adapted to perform the described functions of the respective parts. The mentioned method, steps can be realized in individual functional blocks or by individual devices, or one or more of the method, steps can be realized in a single functional block or by a single device.

The present invention also covers any conceivable combination of method steps and operations described above, and any conceivable combination of nodes, apparatuses, modules or elements described above, as long as the above-described concepts of methodology and structural arrangement are applicable.

It should be further noted that the individual features of the different embodiments of the invention may individually or in arbitrary combination be subject matter to another invention.

It would be appreciated by a person skilled in the art that numerous variations and/or modifications may be made to the present invention as shown in the specific embodiments without departing from the spirit or scope of the invention as broadly described. The present embodiments are, therefore, to be considered in all respects to be illustrative and not restrictive.

We claim:

1. A method for bearer management signalling in a communication network, the method comprising of:
   receiving a union of resource (UR) request message from a relay node (RN) at a donor base station (DeNB) of the communication network, wherein receiving the UR request message comprises receiving a relay node non-access stratum (RN NAS) message from a relay node connected to the DeNB, the RN NAS encapsulating a user equipment non-stratus (UE NAS) message;
   Transporting, by the DeNB, the received UR Request message from the DeNB to a managing entity of user equipment (UE) within an evolved packet core (EPC) network of the communication network, wherein the managing entity of the UE are network nodes that manage or administer the UE, and comprises at least one of the following: a mobility management entity serving the user equipment (MME_UE), a serving gate way, a packet gate way, and a PCRF;
   Receiving an Intersection of Admission (IA) Response by the DeNB for the transported "UR Request" from one of the network nodes of the management entity, wherein receiving the IA response comprises receiving the IA response from the MME UE; and
   forwarding the received IA response to the UE via the relay node.

2. The method of claim 1 wherein receiving the UR Request further comprising:
   receiving a user equipment non access stratum message (UE NAS) message at the relay node from the user equipment;
   Tagging, by the relay node, the received UE NAS message, wherein tagging comprises adding a relay node identity (RN_ID) with the received UE NAS message; and
   Forwarding, by the relay node, the tagged UE NAS message to the DeNB.

3. The method of claim 1, wherein receiving the IA response comprises:
   Receiving, by the managing entity, the UR request message;
   determining, by the managing entity, the MME UE for the user equipment associated with the UR request message;
   Granting, an utmost "UR Request" by the MME_UE, wherein granting the utmost UR request comprises storing a relay node identifier (RN_ID), and generating the "IA Response" message; and
   Forwarding, by the MME_UE, the generated IA response to the DeNB.

4. The method of claim 1, wherein receiving the UR request message comprises receiving the UR request message is received over an Uu interface between the relay node and the DeNB.

5. A method for bearer management signalling in a communication network, the method comprising of:
   receiving a union of resource (UR) request message from a relay node (RN) at a donor base station (DeNB) of the communication network, the UR request message comprising an union of a bearer resource request from a user equipment and a bearer resource request from a relay node serving the user equipment, the bearer resource request from the relay node encapsulating the bearer resource request from the user equipment and generated by the relay node in response to receipt the bearer resource request from the user equipment at the relay node;

Transporting the received UR Request message by the DeNB to a managing entity of user equipment (UE) within an evolved packet core IEPC) network of the communication network, wherein the transporting the UR request message comprising transporting the UR request message to a mobility management entity serving the user equipment (MME_UE);

Receiving an Intersection of Admission (IA) Response by the DeNB for the transported UR Request, from the MME UE; and forwarding the received IA response to the UE via the relay node.

6. The method of claim 5, wherein receiving the IA response comprises further comprising:

Receiving, by the MME UE, the UR request;

Granting an utmost UR Request by the MME_UE, wherein granting the utmost UR request comprises storing a relay node identifier (RN_ID), Generating the IA Response message; and Forwarding the generated IA response message to the DeNB, wherein the IA response includes at least one of the following: an "IA Response Accept and an IA Response Reject.

7. A communication network comprising:

a relay node; and a donor base station (DeNB) connected to the relay node, wherein the donor base station comprises:

A receiver for receiving a bearer resource request from the relay node, wherein the bearer resource request message is received as a relay node non-access stratum (RN NAS) message encapsulating user equipment non-access stratum 'UE NAS Message' from a user equipment (UE), the UE NAS message generated by the UE in response to establishing an active connection with the communication network, wherein the RN NAS message is tagged by adding a relay node identity (RN_ID);

a transmitter configured to forward the received bearer resource request to a management entity of an evolved packet edge (EPE) node of the communication network;

wherein the receiver is configured to receive an intersection of admission (IA) response from the management entity of the EPE in response to the bearer resource request; and wherein the transmitter is configured to forward the received IA response to the UE via the relay node, wherein the relay node is transparent to the UE.

8. The communication network of claim 7, wherein the communication network is a long term evolution (LTE) network.

9. The communication network of the claim 7, wherein the relay node is configured to extend an area of service for the DeNB.

10. The communication network of claim 7, wherein the user equipment is a wireless communication device.

11. The communication network of claim 7, wherein the relay node is configured to:

receive the UE NAS message from the UE;

tag a user equipment identity (UE ID) with the received UE NAS message; and create an union of resource (UR) request message by encapsulating the tagged UE NAS message in the RN NAS message.

12. The communication network of claim 7, wherein the management entity comprises at least one of: a plurality of mobile management entities each serving at least one of a plurality of relay nodes and a plurality of base stations, a serving gate way, a packet gate way, and a policy and charging rule function (PCRF).

* * * * *